United States Patent
Rucker

(10) Patent No.: US 8,316,156 B2
(45) Date of Patent: Nov. 20, 2012

(54) METHOD AND APPARATUS FOR INTERFACING DEVICE DRIVERS TO SINGLE MULTI-FUNCTION ADAPTER

(75) Inventor: James Dean Rucker, Austin, TX (US)

(73) Assignee: Intel-Ne, Inc., Wilmington, DE (US)

( * ) Notice: Subject to any disclaimer, the term of this patent is extended or adjusted under 35 U.S.C. 154(b) by 1398 days.

(21) Appl. No.: 11/356,500

(22) Filed: Feb. 17, 2006

(65) Prior Publication Data

US 2007/0198720 A1 Aug. 23, 2007

(51) Int. Cl.
*G06F 15/16* (2006.01)
(52) U.S. Cl. .......... 709/250; 709/217; 709/224
(58) Field of Classification Search ........ 709/203, 709/250, 223, 224
See application file for complete search history.

(56) References Cited

U.S. PATENT DOCUMENTS

| | | |
|---|---|---|
| 5,400,326 A | 3/1995 | Smith |
| 5,434,976 A | 7/1995 | Tan et al. |
| 5,758,075 A | 5/1998 | Graziano et al. |
| 5,832,216 A | 11/1998 | Szczepanek |
| 5,953,511 A | 9/1999 | Sescila, III et al. |
| 6,052,751 A | 4/2000 | Runaldue et al. |
| 6,067,300 A | 5/2000 | Baumert et al. |
| 6,145,045 A | 11/2000 | Falik et al. |
| 6,199,137 B1 | 3/2001 | Aguilar et al. |
| 6,243,787 B1 | 6/2001 | Kagan et al. |
| 6,389,479 B1 | 5/2002 | Boucher et al. |
| 6,400,730 B1 | 6/2002 | Latif et al. |
| 6,408,347 B1 | 6/2002 | Smith et al. |
| 6,418,201 B1 | 7/2002 | Holland et al. |
| 6,427,171 B1 | 7/2002 | Craft et al. |
| 6,502,156 B1 | 12/2002 | Sacker et al. |
| 6,535,518 B1 | 3/2003 | Hu et al. |
| 6,591,302 B2 | 7/2003 | Boucher et al. |
| 6,591,310 B1 | 7/2003 | Johnson |
| 6,594,329 B1 | 7/2003 | Susnow |
| 6,594,712 B1 | 7/2003 | Pettey et al. |
| 6,601,126 B1 | 7/2003 | Zaidi et al. |
| 6,625,157 B2 | 9/2003 | Niu et al. |
| 6,658,521 B1 | 12/2003 | Biran et al. |
| 6,661,773 B1 | 12/2003 | Pelissier et al. |
| 6,675,200 B1 | 1/2004 | Cheriton et al. |
| 6,690,757 B1 | 2/2004 | Bunton et al. |

(Continued)

OTHER PUBLICATIONS

Office Action received for U.S. Appl. No. 11/315,685, mailed on May 14, 2010, 34 Pages.

(Continued)

*Primary Examiner* — Barbara Burgess
(74) *Attorney, Agent, or Firm* — Christopher K. Gagne

(57) ABSTRACT

Systems which utilize a series of managers to handle resource management. Three types of managers are preferably used, with each manager being in one of two states, active or available. The types of managers are Global Interface Manager (GIM), Resource Manager (RM) and Access Manager (AM). Associated with each device driver for a given function is a GIM. The device driver may be associated with one or more RMs and/or AMs. Among managers of a given type, one is the active manager and all other managers of that specific type are available and work with the active manager to handle resource requests. As there can be RMs for different resources, the active manager concept is applied to the RMs associated with each resource. Mechanisms are present to allow the active manager and related information to be transferred to an available manager if necessary.

21 Claims, 9 Drawing Sheets

U.S. PATENT DOCUMENTS

| | | |
|---|---|---|
| 6,693,901 B1 | 2/2004 | Byers et al. |
| 6,694,394 B1 | 2/2004 | Bachrach |
| 6,697,868 B2 | 2/2004 | Craft et al. |
| 6,704,831 B1 | 3/2004 | Avery |
| 6,721,806 B2 | 4/2004 | Boyd et al. |
| 6,751,235 B1 | 6/2004 | Susnow et al. |
| 6,760,307 B2 | 7/2004 | Dunning et al. |
| 6,763,419 B2 | 7/2004 | Hoese et al. |
| 6,778,548 B1 | 8/2004 | Burton et al. |
| 6,813,653 B2 | 11/2004 | Avery |
| 7,089,326 B2 | 8/2006 | Boucher et al. |
| 7,093,024 B2 | 8/2006 | Craddock et al. |
| 7,142,539 B2 | 11/2006 | Grinfeld |
| 7,149,817 B2 | 12/2006 | Pettey |
| 7,149,819 B2 | 12/2006 | Pettey |
| 7,177,941 B2 | 2/2007 | Biran et al. |
| 7,233,984 B2 | 6/2007 | Mohamed et al. |
| 7,237,510 B2 | 7/2007 | White |
| 7,299,266 B2 | 11/2007 | Boyd et al. |
| 7,299,290 B2 | 11/2007 | Karpoff |
| 7,308,551 B2 | 12/2007 | Arndt et al. |
| 7,376,755 B2 | 5/2008 | Pandya |
| 7,376,765 B2 | 5/2008 | Rangan et al. |
| 7,376,770 B2 | 5/2008 | Arndt et al. |
| 7,383,312 B2 | 6/2008 | Biran et al. |
| 7,383,483 B2 | 6/2008 | Biran et al. |
| 7,388,866 B2 | 6/2008 | Fan et al. |
| 7,392,172 B2 | 6/2008 | Rostampour |
| 7,401,126 B2 | 7/2008 | Pekkala et al. |
| 7,426,674 B2 | 9/2008 | Anderson et al. |
| 7,430,211 B2 | 9/2008 | Elzur |
| 7,437,738 B2 | 10/2008 | Shah et al. |
| 7,451,197 B2 | 11/2008 | Davis et al. |
| 7,535,913 B2 | 5/2009 | Minami et al. |
| 7,543,087 B2 | 6/2009 | Philbrick et al. |
| 7,551,614 B2 | 6/2009 | Teisberg et al. |
| 7,565,504 B2 | 7/2009 | Garcia et al. |
| 7,688,838 B1 | 3/2010 | Aloni et al. |
| 7,782,869 B1 | 8/2010 | Chitlur Srinivasa |
| 7,782,905 B2 | 8/2010 | Keels et al. |
| 7,843,906 B1 | 11/2010 | Chidambaram et al. |
| 7,849,232 B2 | 12/2010 | Sharp et al. |
| 7,889,762 B2 | 2/2011 | Keels et al. |
| 8,032,664 B2 | 10/2011 | Sharp et al. |
| 2001/0049740 A1 | 12/2001 | Karpoff |
| 2002/0073257 A1 | 6/2002 | Beukema et al. |
| 2002/0085562 A1 | 7/2002 | Hufferd et al. |
| 2002/0147839 A1 | 10/2002 | Boucher et al. |
| 2002/0161919 A1 | 10/2002 | Boucher et al. |
| 2002/0172195 A1 | 11/2002 | Pekkala et al. |
| 2002/0191627 A1* | 12/2002 | Subbiah et al. ............... 370/428 |
| 2003/0031172 A1 | 2/2003 | Grinfeld |
| 2003/0050990 A1 | 3/2003 | Craddock et al. |
| 2003/0097428 A1 | 5/2003 | Afkhami et al. |
| 2003/0165160 A1 | 9/2003 | Minami et al. |
| 2003/0169775 A1 | 9/2003 | Fan et al. |
| 2003/0200284 A1 | 10/2003 | Philbrick et al. |
| 2003/0217185 A1 | 11/2003 | Thakur et al. |
| 2003/0237016 A1 | 12/2003 | Johnson et al. |
| 2004/0010545 A1 | 1/2004 | Pandya |
| 2004/0010594 A1 | 1/2004 | Boyd et al. |
| 2004/0015622 A1 | 1/2004 | Avery |
| 2004/0030770 A1 | 2/2004 | Pandya |
| 2004/0037319 A1 | 2/2004 | Pandya |
| 2004/0049600 A1* | 3/2004 | Boyd et al. .................. 709/250 |
| 2004/0049774 A1 | 3/2004 | Boyd et al. |
| 2004/0062267 A1 | 4/2004 | Minami et al. |
| 2004/0083984 A1 | 5/2004 | White |
| 2004/0085984 A1 | 5/2004 | Elzur |
| 2004/0093389 A1 | 5/2004 | Mohamed et al. |
| 2004/0093411 A1* | 5/2004 | Elzur et al. ................... 709/224 |
| 2004/0098369 A1 | 5/2004 | Elzur |
| 2004/0100924 A1 | 5/2004 | Yam |
| 2004/0153578 A1 | 8/2004 | Elzur |
| 2004/0193908 A1 | 9/2004 | Garcia et al. |
| 2004/0221276 A1 | 11/2004 | Raj |
| 2004/0236877 A1* | 11/2004 | Burton ............................ 710/22 |
| 2005/0044264 A1 | 2/2005 | Grimminger et al. |
| 2005/0080982 A1 | 4/2005 | Vasilevsky et al. |
| 2005/0102682 A1 | 5/2005 | Shah et al. |
| 2005/0149623 A1 | 7/2005 | Biran et al. |
| 2005/0220128 A1 | 10/2005 | Tucker et al. |
| 2005/0223118 A1* | 10/2005 | Tucker et al. .................. 709/250 |
| 2005/0265352 A1 | 12/2005 | Biran et al. |
| 2006/0039374 A1 | 2/2006 | Belz et al. |
| 2006/0045098 A1 | 3/2006 | Krause |
| 2006/0105712 A1* | 5/2006 | Glass et al. .................. 455/41.2 |
| 2006/0126619 A1 | 6/2006 | Teisberg et al. |
| 2006/0136570 A1* | 6/2006 | Pandya .......................... 709/217 |
| 2006/0146814 A1 | 7/2006 | Shah et al. |
| 2006/0193327 A1 | 8/2006 | Arndt et al. |
| 2006/0195617 A1 | 8/2006 | Arndt et al. |
| 2006/0230119 A1 | 10/2006 | Hausauer et al. |
| 2006/0235977 A1 | 10/2006 | Wunderlich et al. |
| 2006/0236063 A1 | 10/2006 | Hausauer et al. |
| 2006/0248047 A1 | 11/2006 | Grier et al. |
| 2006/0251109 A1 | 11/2006 | Muller et al. |
| 2006/0259644 A1* | 11/2006 | Boyd et al. ................... 709/250 |
| 2006/0274787 A1* | 12/2006 | Pong ............................. 370/469 |
| 2007/0083638 A1* | 4/2007 | Pinkerton et al. ............. 709/224 |
| 2007/0136554 A1* | 6/2007 | Biran et al. .................... 711/203 |
| 2007/0150676 A1 | 6/2007 | Arimilli et al. |
| 2007/0165672 A1 | 7/2007 | Keels et al. |
| 2007/0168567 A1 | 7/2007 | Boyd et al. |
| 2007/0168693 A1* | 7/2007 | Pittman ............................. 714/4 |
| 2007/0208820 A1 | 9/2007 | Makhervaks et al. |
| 2007/0226386 A1 | 9/2007 | Sharp et al. |
| 2007/0226750 A1 | 9/2007 | Sharp et al. |
| 2008/0028401 A1 | 1/2008 | Geisinger |
| 2008/0043750 A1 | 2/2008 | Keels et al. |
| 2008/0147822 A1 | 6/2008 | Benhase et al. |
| 2008/0244577 A1 | 10/2008 | Le et al. |
| 2009/0254647 A1 | 10/2009 | Elzur et al. |
| 2010/0332694 A1 | 12/2010 | Sharp et al. |
| 2011/0099243 A1 | 4/2011 | Keels et al. |

OTHER PUBLICATIONS

Office Action received for U.S. Appl. No. 11/624,849, mailed on May 24, 2010, 11 Pages.
Response to Office Action received for U.S. Appl. No. 11/356,501, filed May 28, 2010, 14 Pages.
Notice of Allowance received for U.S. Appl. No. 11/357,449, mailed on Jun. 8, 2010, 13 Pages.
Final Office Action received for U.S. Appl. No. 11/315,685 mailed on Aug. 11, 2009, 34 Pages.
Notice of Allowance received for U.S. Appl. No. 11/356,501, mailed on Aug. 7, 2009, 22 Pages.
Response to Non-Final Office Action received for U.S. Appl. No. 11/357,445, filed Jul. 8, 2009, 21 Pages.
Response to Non-Final Office Action received for U.S. Appl. No. 11/357,449, filed Aug. 17, 2009, 19 Pages.
Response to Final Office Action received for U.S. Appl. No. 11/315,685, filed Sep. 17, 2009, 22 Pages.
Final Office Action received for U.S. Appl. No. 11/357,445, mailed on Sep. 10, 2009, 43 Pages.
Non-Final Office Action received for U.S. Appl. No. 11/356,493, mailed on Sep. 21, 2009, 26 Pages.
Amendment after Notice of Allowance received for U.S. Appl. No. 11/356,501, filed Oct. 8, 2009, 11 Pages.
Response to Final Office Action received for U.S. Appl. No. 11/357,445, filed Nov. 10, 2009, 17 Pages.
Response to Non-Final Office Action received for U.S. Appl. No. 11/356,493, filed Nov. 17, 2009, 13 Pages.
Notice of Allowance received for U.S. Appl. No. 11/356,501, mailed on Nov. 24, 2009, 12 Pages.
Final Office Action received for U.S. Appl. No. 11/357,449, mailed on Nov. 18, 2009, 17 Pages.
Non-Final Office Action received for U.S. Appl. No. 11/624,849, mailed on Nov. 23, 2009, 34 Pages.
Response to Final Office Action received for U.S. Appl. No. 11/357,449, filed Dec. 8, 2009, 13 Pages.
Non-Final Office Action received for U.S. Appl. No. 11/357,449, mailed on Dec. 21, 2009, 8 Pages.

Non Final Office Action received for U.S. Appl. No. 11/315,685, mailed on Jan. 4, 2010. 26 Pages.
Response to Final Office Action received for U.S. Appl. No. 11/315,685, filed Jul. 8, 2010, 23 Pages.
Final Office Action received for U.S. Appl. No. 11/356,493, mailed on Jul. 8, 2010, 17 Pages.
Response to the Non Final Office Action received for U.S. Appl. No. 11/624,849, filed Jul. 29, 2010, 12 Pages.
Notice of Allowance received for U.S. Appl. No. 11/356,501, mailed on Aug. 19, 2010, 15 Pages.
Response to Final Office Action received for U.S. Appl. No. 11/356,500, filed Sep. 9, 2010, 9 Pages.
Response to Non-Final Office Action received for U.S. Appl. No. 11/356,501, filed Mar. 26, 2008, 16 pages.
Non-Final Office Action received for U.S. Appl. No. 11/356,501, mailed on Jul. 7, 2008, 10 pages.
Response to Non-Final Office Action received for U.S. Appl. No. 11/356,501, filed Nov. 6, 2008, 16 pages.
Final Office Action received for U.S. Appl. No. 11/356,501, mailed on Jan. 22, 2009, 12 pages.
Response to Final Office Action received for U.S. Appl. No. 11/356,501, filed Apr. 2, 2009, 15 pages.
Notice of Allowance received for U.S. Appl. No. 11/356,501, mailed on Jun. 11, 2009, 8 pages.
Response to Office Action received for U.S. Appl. No. 11/624,849, filed Jan. 22, 2010, 15 Pages.
Office Action received for U.S. Appl. No. 11/356,493, mailed on Feb. 3, 2010, 15 Pages.
Response to Office Action received for U.S. Appl. No. 11/357,449, filed on Mar. 4, 2010, 12 Pages.
Response to Office Action received for U.S. Appl. No. 11/315,685, filed on Mar. 5, 2010, 24 Pages.
Shah, et al., "Direct Data Placement over Reliable Transports (Version 1.0)", RDMA Consortium document, Oct. 2002, pp. 1-35.
"Intel Virtual Interface (VI) Architecture Performance Suite User's Guide", Preliminary Version V0.3, Intel Corporation, Dec. 16, 1998, 28 pages.
Jinzanki, "Construction of Virtual Private Distributed System of Comet", RWC 2000 Symposium, Japan, XP002243009, Jan. 2000, pp. 1-3.
Pathikonda, et al., "Virtual Interface (VI) Architecture Overview", Enterprise Server Group, Intel Corporation, Apr. 1998, pp. 1-33.
Speight, et al., "Realizing the Performance Potential of the Virtual Interface Architecture", Proceedings of the 13th international conference on Supercomputing, Rhodes, Greece, 1999, pp. 184-192.
Response to Non-Final Office Action received for U.S. Appl. No. 09/784,761, filed Jul. 12, 2006, 35 pages.
Non-Final Office Action received for U.S. Appl. No. 09/784,761, mailed on Feb. 14, 2006, 19 pages.
Response to Non-Final Office Action received for U.S. Appl. No. 09/784,761, filed Nov. 26, 2005, 34 pages.
Final Office Action received for U.S. Appl. No. 09/784,761, mailed on Jul. 29, 2005, 25 pages.
Response to Non-Final Office Action received for U.S. Appl. No. 09/784,761, filed Apr. 19, 2005, 34 pages.
Non-Final Office Action received for U.S. Appl. No. 09/784,761, mailed on Feb. 14, 2005, 24 pages.
Response to Non-Final Office Action received for U.S. Appl. No. 09/784,761, filed Sep. 29, 2004, 15 pages.
Non-Final Office Action received for U.S. Appl. No. 09/784,761, mailed on Jul. 12, 2004, 12 pages.
Non-Final Office Action received for U.S. Appl. No. 09/817,008, mailed on Jul. 9, 2004, 19 pages.
Response to Non-Final Office Action received for U.S. Appl. No. 09/817,008, filed Nov. 4, 2004, 19 pages.
Non-Final Office Action received for U.S. Appl. No. 09/817,008, mailed on Nov. 18, 2005, 23 pages.
Response to Non-Final Office Action received for U.S. Appl. No. 09/817,008, filed Apr. 18, 2006, 33 pages.
Final Office Action received for U.S. Appl. No. 09/817,008, mailed on Jul. 14, 2006, 7 pages.
Response to Final Office Action received for U.S. Appl. No. 09/817,008, filed Nov. 14, 2006, 40 pages.
Non-Final Office Action received for U.S. Appl. No. 09/817,008, mailed on Feb. 9, 2007, 17 pages.
Response to Non-Final Office Action received for U.S. Appl. No. 09/817,008, filed May 9, 2007, 5 pages.
Non-Final Office Action received for U.S. Appl. No. 09/817,008, mailed on Jul. 25, 2007, 19 pages.
Response to Non-Final Office Action received for U.S. Appl. No. 09/817,008, filed Nov. 26, 2007, 21 pages.
Notice of Allowance received for U.S. Appl. No. 09/817,008, mailed on Mar. 28, 2008, 23 pages.
Amendment after Notice of Allowance received for U.S. Appl. No. 09/817,008, filed Apr. 2, 2008, 20 pages.
Non-Final Office Action received for U.S. Appl. No. 11/357,446, mailed on Jun. 3, 2008, 24 pages.
Response to Non-Final Office Action received for U.S. Appl. No. 11/357,446, filed Nov. 10, 2008, 26 pages.
Final Office Action received for U.S. Appl. No. 11/357,446, mailed on Dec. 31, 2008, 22 pages.
Non-Final Office Action received for U.S. Appl. No. 11/315,685, mailed on Feb. 18, 2009, 25 pages.
Response to Non-Final Office Action received for U.S. Appl. No. 11/315,685, filed Apr. 30, 2009, 22 pages.
Non-Final Office Action received for U.S. Appl. No. 11/357,445, mailed on Aug. 4, 2008, 18 pages.
Response to Non-Final Office Action received for U.S. Appl. No. 11/357,445, filed Nov. 7, 2008, 19 pages.
Final Office Action received for U.S. Appl. No. 11/357,445, mailed on Dec. 24, 2008, 19 pages.
Response to Final Office Action received for U.S. Appl. No. 11/357,445, filed Mar. 4, 2009, 18 pages.
Non-Final Office Action received for U.S. Appl. No. 11/357,445, mailed on Apr. 24, 2009, 21 pages.
Non-Final Office Action received for U.S. Appl. No. 11/357,449, mailed on Jun. 4, 2009, 13 pages.
Non-Final Office Action received for U.S. Appl. No. 10/737,556, mailed on Jul. 6, 2004, 10 pages.
Supplemental Non-Final Office Action received for U.S. Appl. No. 10/737,556, mailed on Sep. 21, 2004, 8 pages.
Response to Supplemental Non-Final Office Action received for U.S. Appl. No. 10/737,556, filed Oct. 12, 2004, 4 pages.
Non-Final Office Action received for U.S. Appl. No. 10/737,556, mailed on Jan. 26, 2005, 11 pages.
Response to Non-Final Office Action received for U.S. Appl. No. 10/737,556, filed Apr. 19, 2005, 24 pages.
Final Office Action received for U.S. Appl. No. 10/737,556, mailed on Jul. 28, 2005, 19 pages.
Response to Final Office Action received for U.S. Appl. No. 10/737,556, filed Nov. 26, 2005, 27 pages.
Non-Final Office Action received for U.S. Appl. No. 10/737,556, mailed on Feb. 14, 2006, 14 pages.
Response to Non-Final Office Action received for U.S. Appl. No. 10/737,556, filed Jul. 12, 2006, 31 pages.
Notice of Allowance received for U.S. Appl. No. 10/737,556, mailed on Oct. 3, 2006, 12 pages.
Notice of Allowance received for U.S. Appl. No. 09/784,761, mailed on Oct. 6, 2006, 14 pages.
Mayo, John S., "The role of microelectronics in communication", Scientific American, Sep. 1977, pp. 192-209.
Warmke, Doug, "Building Up Chips Using VHDL and Synthesis", System Design, Dec. 1994/Jan. 1995, 7 pages.
Non-Final Office Action received for U.S. Appl. No. 11/356,501, mailed on Dec. 26, 2007, 12 pages.
Office Action received for U.S. Appl. No. 11/624,849, mailed on Mar. 10, 2010, 15 pages.
Amendment after Notice of Allowance received for U.S. Appl. No. 11/356,501, filed Jan. 29, 2010, 10 pages.
Response to Office Action received for U.S. Appl. No. 11/624,849, filed Mar. 31, 2010, 14 pages.
Response to Office Action received for U.S. Appl. No. 11/356,493, filed Apr. 2, 2010, 13 pages.
Office Action received for U.S. Appl. No. 11/356,501, mailed on Apr. 13, 2010, 16 pages.

Non Final Office Action received for the U.S. Appl. No. 11/356,493, mailed on Oct. 13, 2010, 17 pages.
Final Office Action received for U.S. Appl. No. 11/624,849, mailed on Oct. 14, 2010, 11 pages.
Response to Final Office Action received for U.S. Appl. No. 11/624,849, filed Dec. 8, 2010, 9 pages.
Non-Final Office Action received for the U.S. Appl. No. 11/315,685, mailed on Dec. 20, 2010, 32 pages.
Notice of Allowance received for the U.S. Appl. No. 11/624,849, mailed on Dec. 20, 2010, 6 pages.
Response to Non-Final Office Action received for the U.S. Appl. No. 11/356,493, filed Jan. 3, 2011, 10 pages.
Final Office Action received for U.S. Appl. No. 12/874,739, mailed on Jan. 19, 2011, 12 pages.
Final Office Action received for U.S. Appl. No. 11/356,493, mailed on Feb. 15, 2011, 17 pages.
Response to Non-Final Office Action received for U.S. Appl. No. 11/356,493, filed Jan. 3, 2011, 10 pages.
Response to Non-Final Office Action received for the U.S. Appl. No. 11/315,685, filed Feb. 25, 2011, 20 pages.
Final Office Action received for the U.S. Appl. No. 11/315,685, mailed on Mar. 7, 2011, 31 pages.
Response to Non-Final Office Action received for U.S. Appl. No. 12/874,739, filed Mar. 3, 2011, 10 pages.
Office Action Received for U.S. Appl. No. 11/315,685, mailed on May 9, 2011, 39 pages.
Response to Office Action Received for U.S. Appl. No. 11/315,685, filed Apr. 20, 2011, 23 pages.
Office Action Received for U.S. Appl. No. 11/356,493, mailed on May 24, 2011, 18 pages.
Response to Non-Final Office Action Received for U.S. Appl. No. 11/356,493, filed Apr. 15, 2011; 10 pages.
Response to Non-Final Office Action Received for U.S. Appl. No. 11/315,685, filed Jun. 14, 2011; 26 pages.
Notice of Allowance Received for U.S. Appl. No. 12/874,739, mailed on Jun. 1, 2011; 115 pages.
Non Final Office Action Received for U.S. Appl. No. 11/356,493, mailed on May 24, 2011; 18 pages.
Response to Non-Final Office Action Received for U.S. Appl. No. 11/356,493, filed Jul. 13, 2011; 10 pages.

* cited by examiner

METHOD AND APPARATUS FOR INTERFACING DEVICE DRIVERS TO SINGLE MULTI-FUNCTION ADAPTER

BACKGROUND OF THE INVENTION

1. Field of the Invention
2. Description of the Related Art

In complex computer systems, particularly those in large transaction processing environments as shown in FIG. 1, the available servers 100 are often clustered together to improve overall system performance. Second, these clustered servers 100 are then connected by a storage area network (SAN) to storage units 106, so that all have high performance access to storage. Further, the servers 100 are also connected to an Ethernet network to allow the various user computers 110 to interact with the servers 100. Thus, the servers 100 use a first fabric 102 for clustering, a second fabric 104 for the SAN and a third fabric 108 to communicate with the users. In normal use the cluster fabric 102 is one such as InfiniBand, the SAN fabric 104 is one such as Fibre Channel and the user fabric 108 is one such as Ethernet. Therefore, in this configuration each of the servers 100 must have three different adapters to communicate with the three fabrics. Further, the three adaptors take up physical space, consume more power and produce more heat in a particular server, thus limiting the density of available servers in a high processor count environment. This increases cost and complexity of the servers themselves. Additionally three separate networks and fabrics must be maintained.

This is shown additionally in FIG. 2 where the software components are shown. An operating system 200 is present in the server 100. Connected to the operating system 200 is a clustering driver 202 which connects with an InfiniBand host channel adapter (HCA) 204 in the illustrated embodiment. The InfiniBand HCA 204 is then connected to the InfiniBand fabric 102 for clustering. A block storage driver 206 is connected to the operating system 200 and interacts with a Fibre Channel host bus adapter (HBA) 208. The Fibre Channel HBA 208 is connected to the Fibre Channel fabric 104 to provide the SAN capability. Finally, a networking driver 210 is also connected to the operating system 200 to provide the third parallel link and is connected to a series of network interface cards (NICs) 212 which are connected to the Ethernet fabric 108.

Legacy operating systems such as Linux 2.4 or Microsoft NT4 were architected assuming that each "I/O Service" is provided by an independent adapter. An "I/O Service" is defined as the portion of adapter functionality that connects a server onto one of the network fabrics. Referring to FIG. 2, the NIC 212 provides the Networking I/O Service, the HCA 204 provides the Clustering I/O Service, and the HBA 208 provides the Block Storage I/O Service. It would be desirable to allow a single ECA or Ethernet Channel Adapter to provide all three of these I/O Services. Since most traditional high performance networking storage and cluster adapters are PCI based and enumerated as independent adapters by the Plug and Play (PnP) component of the operating system, the software stacks for each fabrics have evolved independently. In order for an ECA to be deployed on such legacy operating systems, its I/O Services must be exported using independent PCI functions. While this type of design fits nicely into the PnP environment, it exposes issues related to shared resources between the PCI functions.

Consider an ECA having networking and storage I/O Services. A first issue is initialization of a specific Ethernet port that is shared between the I/O Services. The independent drivers that are exporting networking and storage concurrently from separate PCI functions may want to utilize a common ECA port. In this case a single Ethernet PHY may need to be initialized by writing to MDIO registers in order to bring the Ethernet link to an active state. Access to the PHY must be coordinated or the drivers may never be able to bring the link to an active state. If the access is not coordinated, a scenario where one driver resets the PHY and then starts initializing various PHY registers when the other driver has already gotten to the point of initializing the same PHY registers can occur. The content of the PHY registers at the end of concurrent initialization performed by both drivers is indeterminate. This could lead to software errors as well as difficulties bringing up the Ethernet link.

A second example is link state change on an Ethernet port that is shared between the I/O Services. Without coordination, a link state change event may be fielded by one of the drivers, which clears the event as part of the normal processing for a link state change. It is highly likely that the second driver will not see the link state change event and therefore not behave properly.

External ports, accelerated connections, and memory registration resources are all examples of resources that must be managed in a way that is intuitive and in a way that takes the best advantage of the functionality provided by an ECA. Given that the services exported by the ECA can be loaded in any order by a PnP enabled operating system and that users can dynamically (or permanently) disable one or more of the services, an ECA should have a flexible mechanism to robustly and transparently transfer resource management responsibility between the various drivers that provide ECA services.

SUMMARY OF THE INVENTION

Systems according to the present invention utilize a series of managers to handle resource management. Three types of managers are preferably used, with each manager being in one of two states, active or available. The types of managers are Global Interface Manager (GIM), Resource Manager (RM) and Access Manager (AM). Associated with each device driver for a given function is a GIM. The device driver may be associated with one or more RMs and/or AMs. Among managers of a given type, one is the active manager and all other managers of that specific type are available and work with the active manager to handle resource requests. As there can be RMs for different resources, the active manager concept is applied to the RMs associated with each resource.

Mechanisms are present to allow the active manager and related information to be transferred to an available manager if necessary.

In this manner device drivers may independently load or unload without concerns for resource management issues of the ECA.

DETAILED DESCRIPTION OF THE PREFERRED EMBODIMENT

Figure 1:
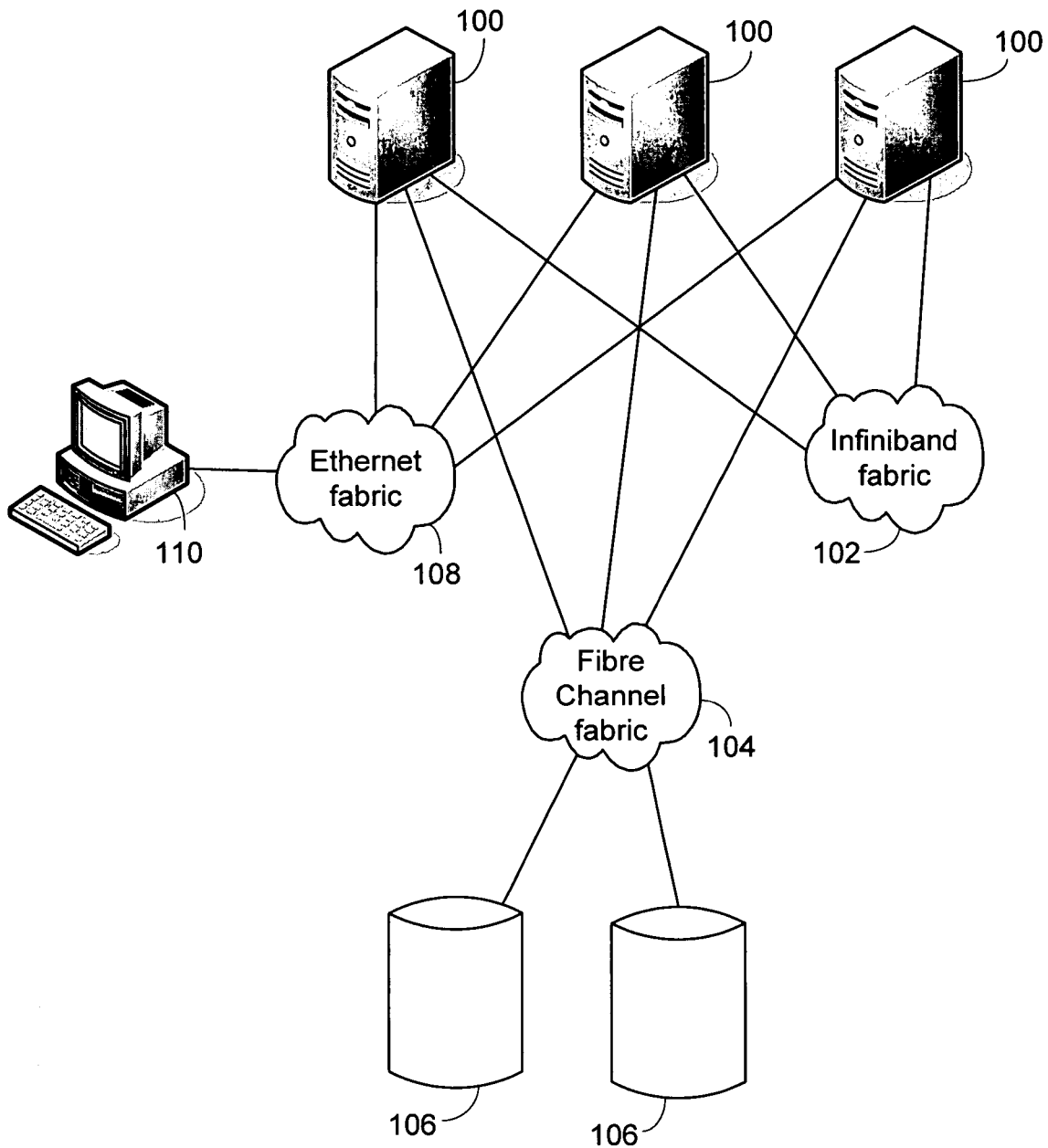
FIG. 1 is a block diagram of a computer system including clustering, user access and storage area networking according to the prior art.
Figure 3:
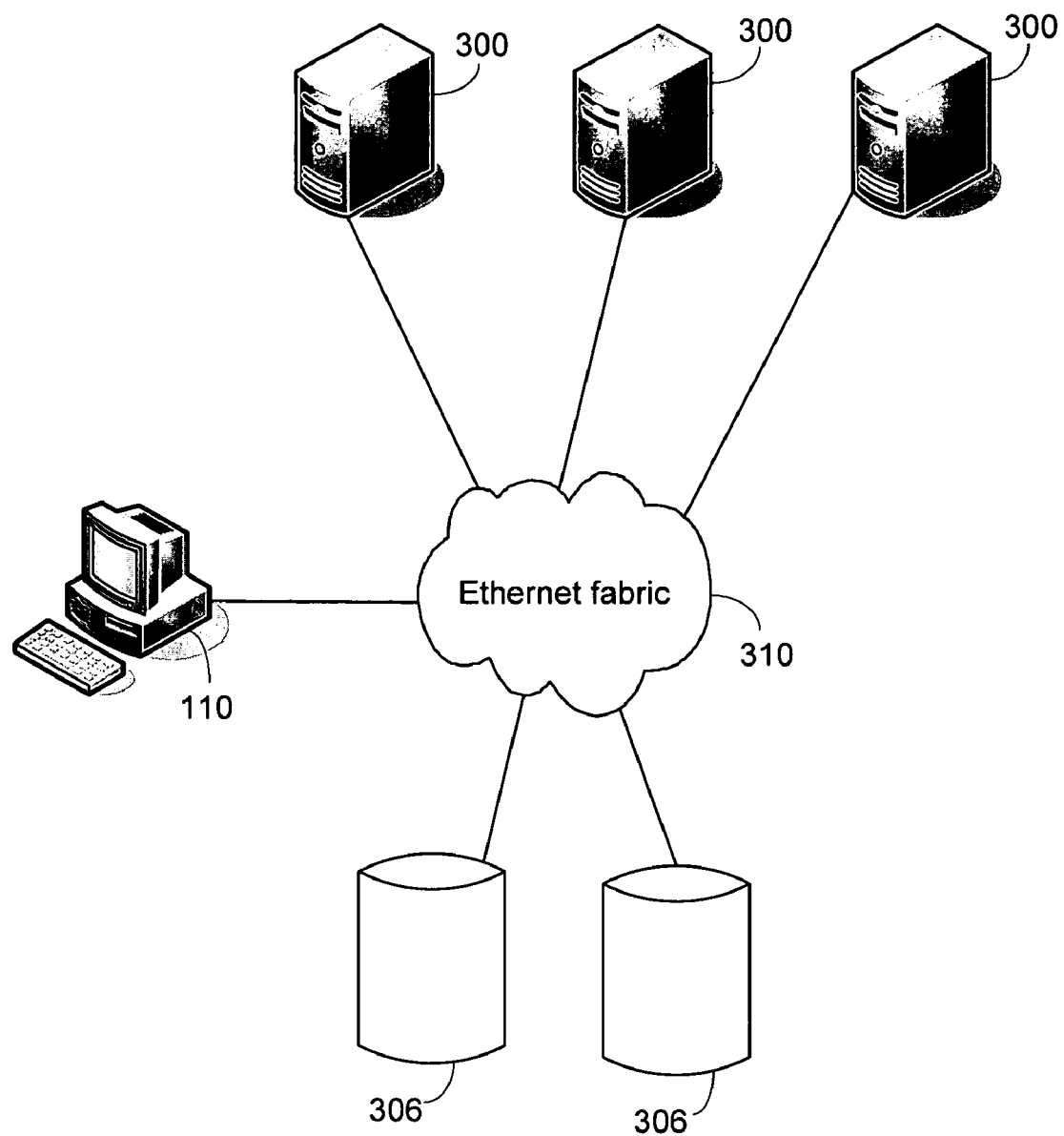
FIG. 3 is a block diagram of a computer system including servers, a user and storage connected by a single fabric according to the present invention.
Figure 4:
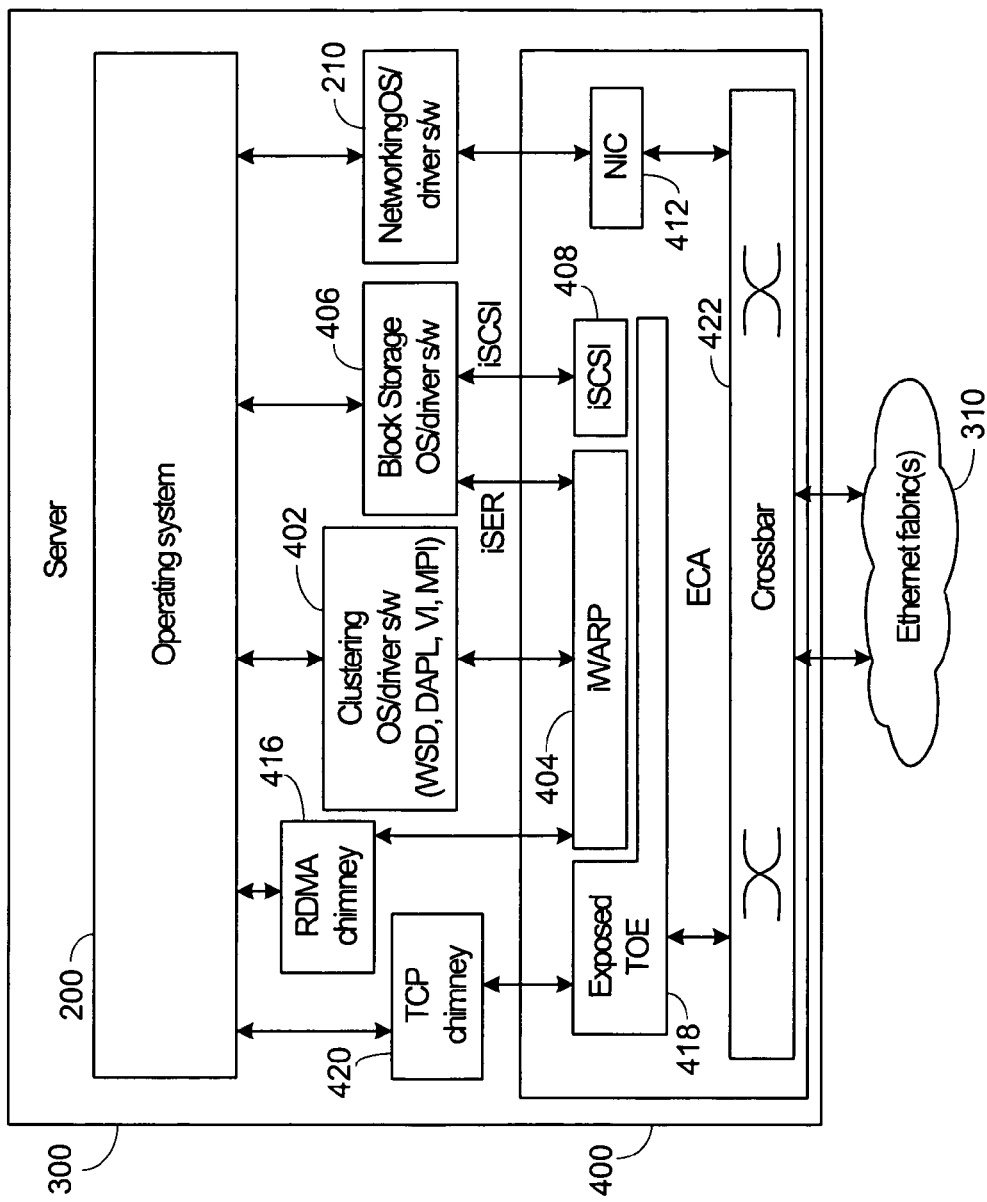
FIG. 4 is a logical block diagram of a server according to FIG. 3.

In the preferred embodiment as shown in FIG. 3, three servers 300 are connected to an Ethernet fabric 310. Preferably this is a higher performance Ethernet fabric 310 than the Ethernet fabric 108 as it is also used for storage area networking and clustering capabilities. As can be seen, there is logically only a single link to a single fabric in the system according to the preferred embodiment, though this may be any number of actual physical links. Storage units 306 are also directly connected to the Ethernet fabric 310. Further, a conventional user 110 is connected to the Ethernet fabric 310. Because only a single fabric 310 is utilized in the designs according to the preferred embodiment, significantly less maintenance and management is required than as in the prior art as shown in FIG. 1. To handle the three varying tasks, clustering, storage and user interface, the server 300 includes an Ethernet channel adapter (ECA) 400 (FIG. 4). This ECA 400 includes builtin capabilities to provide enhanced capabilities over current Ethernet fabrics. These enhancements include RDMA capability, particularly according to the iWARP standard, and iSCSI. iWARP is utilized in the clustering environment, whereas iSCSI is the standard for doing SANs using Ethernet.

Figure 2:
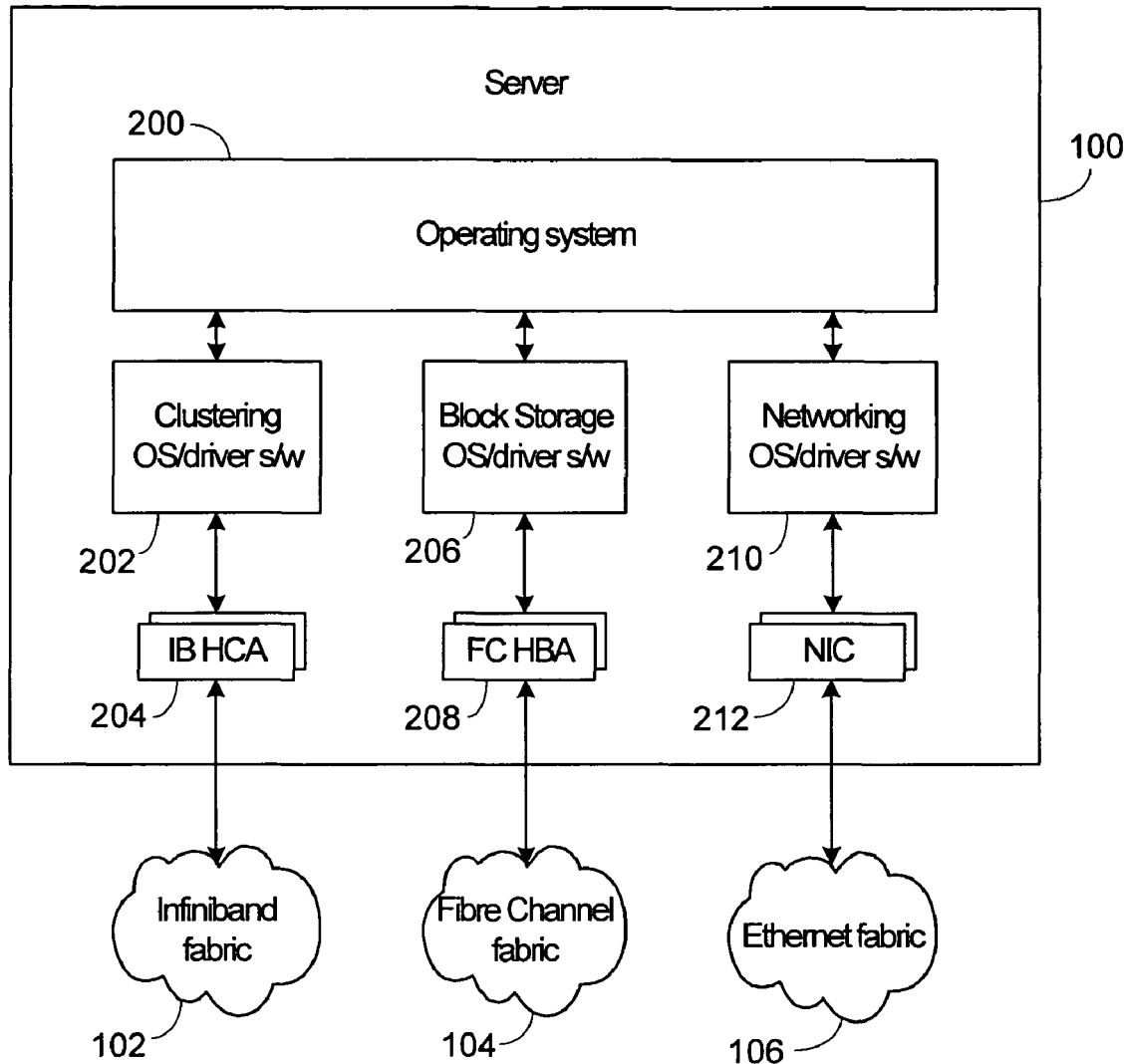
FIG. 2 is a block diagram showing the logical arrangement of a server in the system according to FIG. 1.

Referring to FIG. 4, the server 300 according to the preferred embodiment includes an operating system 200 as in the prior art. It similarly contains a networking driver 210, which is connected to a NIC 412. A block storage driver 406 is also connected to the operating system. It differs slightly from that used in FIG. 2 because in this case it is an iSCSI driver, as opposed to the Fibre Channel driver utilized in FIG. 2. The driver 406 communicates with iSCSI hardware 408 present in the ECA 400. A clustering driver 402 is also slightly different in that it utilizes RDMA capabilities and complies with the iWARP standard. To that end it is connected to an iWARP module 404 in the ECA 400. An RDMA chimney 416 according to the Microsoft Scalable Networking Initiative is present for appropriate Microsoft operating systems to interact with the iWARP module 404 and the operating system 200 to provide improved RDMA capabilities. Because both the iSCSI storage function and the clustering iWARP function need to be very high performance, a TCP offload engine (TOE) 418 is provided to connect to the iWARP module 404 and the iSCSI module 408. Further, a TCP chimney 420, also according to the Microsoft Scalable Networking Initiative, is present for appropriate Microsoft operating systems and is connected to the TOE 418. Both the TOE 418 and the NIC 412 are connected to an Ethernet crossbar switch 422 contained in the ECA 400 to allow flexibility of the various connections to the Ethernet fabric 310.

Figure 5:
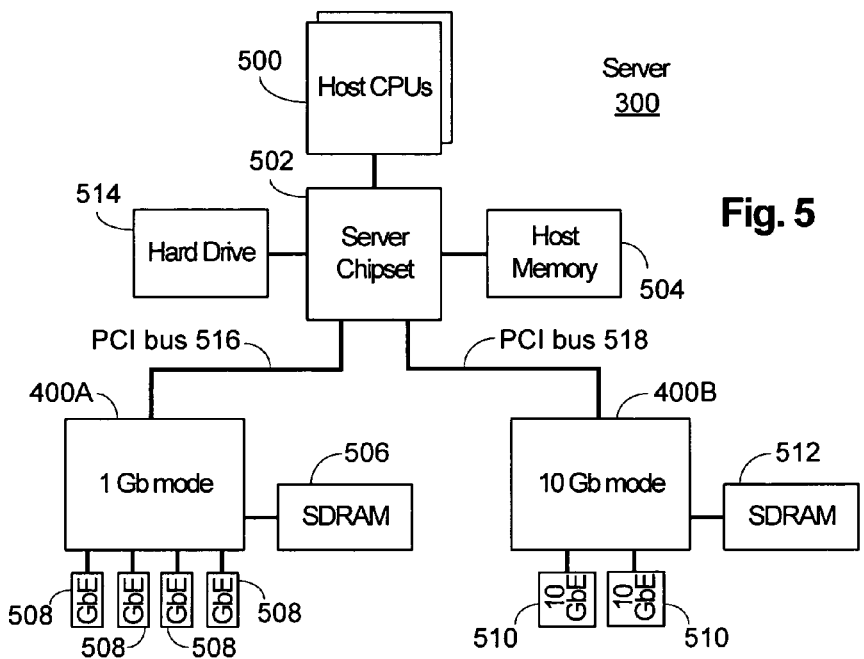
FIG. 5 is a block diagram of the various components of a server of FIG. 3.

Referring then to FIG. 5, a simple block diagram of a server 300 is shown. The various host CPUs 500 are connected to a server chipset 502, which is also connected to server or host memory 504. An optional hard drive 514 is coupled to the server chipset 502 to provide storage of the operating system, device drivers and relevant programs. In the illustrated embodiment further connected to the server chipset 502 using a PCI bus 512, such as a PCI-X bus, is a first ECA 400A, which is shown to be operating in one Gb Ethernet mode. RAM 506 is connected to the ECA 400A to form temporary buffer storage. Four one Gb Ethernet ports 508 are connected to the ECA 400A to provide the actual output capability. In the illustrated embodiment a second ECA, in this case ECA 400B, is connected to the server chipset 502 using a PCI bus 514, such as a PCI-Express bus, and is operating in ten Gb Ethernet mode and includes a pair of ten Gb Ethernet ports 510. RAM 512 is also connected to ECA 400B to provide buffers for its various functions.

Figure 6:
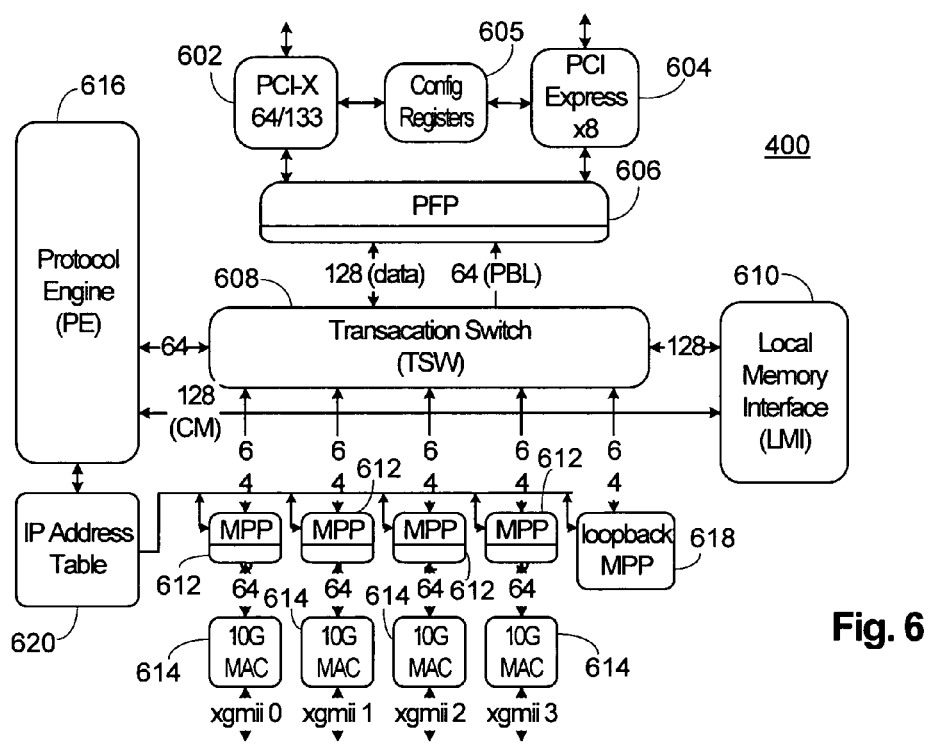
FIG. 6 is a high level block diagram of an Ethernet channel adapter (ECA) of FIG. 5 according to the preferred embodiment.

Referring then to FIG. 6, a block diagram of the ECA 400 according to the preferred embodiment is shown. Various server bus interfaces 602 and 604, such as PCI-X or PCI-Express, are shown to provide connections to the server chip set 502. A set of configuration registers 605 is connected to the server bus interfaces 602 and 604 to present the ECA 400 to the appropriate bus as more fully described below. The server bus interfaces 602 and 604 are connected to a PCI frame parser (PFP) 606. The PFP 606 interfaces the host CPUs 500 into a transaction switch 608. In the preferred embodiment the internal architecture of the ECA 400 is based on serial data packet flows and the transaction switch 608 is used to connect the various internal blocks of the ECA 400 as well as providing the crossbar 422 Function. For example, one of these blocks is a local memory interface 610. This is where the RAM 506 or 512 is connected to allow storage of data being received and transmitted. A series of MAC packet parsers (MPP) 612 are provided to parse data being received from the Ethernet fabric 310. These are also connected to the transaction switch 608 to allow them to provide data to or retrieve data from the local memory interface 610 or the transaction switch 608. The various MPPs 612 are connected to the relevant Ethernet MACs 614 to provide the actual interface to the Ethernet fabric 310. A protocol engine (PE) 616 is connected to the transaction switch 608 and also has a direct connection to the local memory interface 610 to allow higher speed operation. The protocol engine 616 performs all the processing relating to the NIC, TOE, iSCSI and iWARP modules shown in the prior logical block diagram. A special loop-back MPP 618 is provided to allow improved switching capabilities inside the ECA 400. Finally, an IP address table 620 is present to provide the IP addresses utilized by the ECA 400 in its communications over the Ethernet fabric 310.

Figure 7:
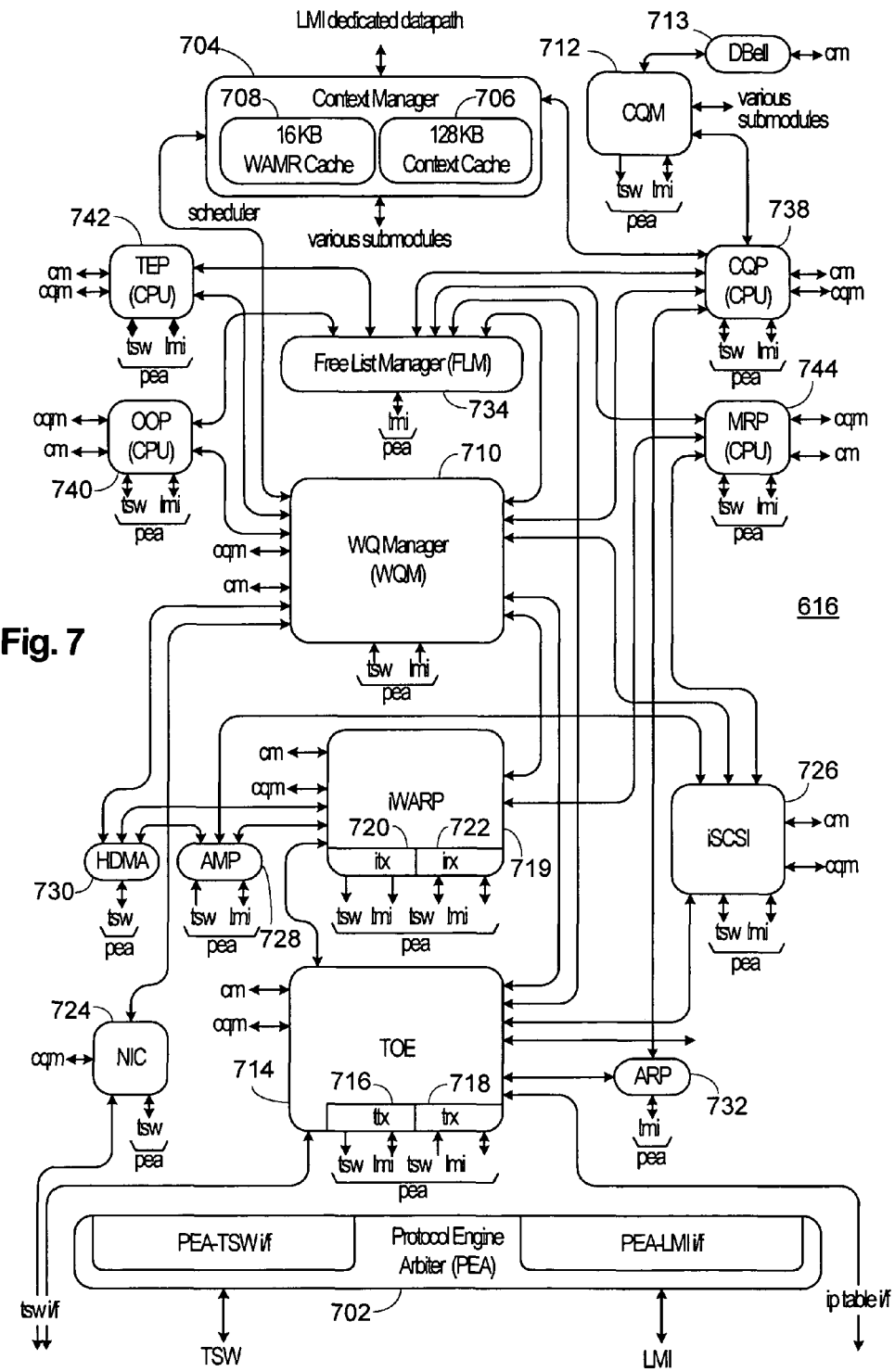
FIG. 7 is a block diagram of the protocol engine of the ECA of FIG. 6.

FIG. 7 illustrates the block diagram of the protocol engine 616 of the preferred embodiment. A protocol engine arbiter (PEA) 702 is connected to the transaction switch 608 and the local memory interface 610 to provide a point of contact between the protocol engine 616 and those devices. Various subcomponents of the protocol engine 616 have their access to those two devices arbitrated by the protocol engine arbiter 702 as indicated by arrows captioned by the relevant portions (tsw or lmi) of the protocol engine arbiter 702 adjacent a bracket labeled pea.

In basic operations, a series of tasks are performed by the various modules or sub-modules in the protocol engine 616 to handle the various iWARP, iSCSI and regular Ethernet traffic. A context manager 704 is provided with a dedicated datapath to the local memory interface 610. As each connection which is utilized by the ECA 400 must have a context, various subcomponents or submodules are connected to the context manager 704 as indicated by the arrows captioned by cm.

Thus all of the relevant submodules can determine context of the various packets as needed. The context manager 704 contains a context cache 706, which caches the context values from the local memory, and a work available memory region cache 708, which contains memory used to store transmit scheduling information to determine which operations should be performed next in the protocol engine 616. The schedules are effectively developed in a work queue manager (WQM) 710. The WQM 710 handles scheduling for all transmissions of all protocols in the protocol engine 616. One of the main activities of the WQM 710 is to determine when data needs to be retrieved from the external memory 506 or 512 or from host memory 504 for operation by one of the various modules. The WQM 710 handles this operation by requesting a time slice from the protocol engine arbiter 702 to allow the WQM 710 to retrieve the desired information and place it in on-chip storage. A completion queue manager (CQM) 712 acts to provide task completion indications to the CPUs 500. The CQM 712 handles this task for various submodules with connections to those submodules indicated by arrows captioned by cqm. A doorbell submodule 713 receives commands from the host, such as "a new work item has been posted to SQ x," and converts these commands into the appropriate context updates.

A TCP off-load engine (TOE) 714 includes submodules of transmit logic 716 and receive logic 718 to handle processing for accelerated TCP/IP connections. The receive logic 716 parses the TCP/IP headers, checks for errors, validates the segment, processes received data, processes acknowledges, updates RTT estimates and updates congestion windows. The transmit logic 716 builds the TCP/IP headers for outgoing packets, performs ARP table look-ups, and submits the packet to the transaction switch 608. An iWARP module 719 includes a transmit logic portion 720 and a receive logic portion 722. The iWARP module 719 implements various layers of the iWARP specification, including the MPA, DDP and RDMAP layers. The receive logic 722 accepts inbound RDMA messages from the TOE 714 for processing. The transmit logic 720 creates outbound RDMA segments from PCI data received from the host CPUs 500.

A NIC module 724 is present and connected to the appropriate items, such as the work queue manager 710 and the protocol engine arbiter 702. An iSCSI module 726 is present to provide hardware acceleration to the iSCSI protocol as necessary.

Typically the host operating system provides the ECA 400 with a set of restrictions defining which user-level software processes are allowed to use which host memory address ranges in work requests posted to the ECA 400. Enforcement of these restrictions is handled by an accelerated memory protection (AMP) module 728. The AMP module 728 validates the iWARP STag using the memory region table (MRT) and returns the associated physical buffer list (PBL) information. An HDMA block 730 is provided to carry out the DMA transfer of information between host memory 504, via one of the bus interfaces 602 or 604, and the transaction switch 608 on behalf of the WQM 710 or the iWARP module 719. An ARP module 732 is provided to retrieve MAC destination addresses from an on-chip memory. A free list manager (FLM) 734 is provided to work with various other modules to determine the various memory blocks which are available. Because the data, be it data packets or control structures, is all contained in packets, a list of the available data blocks is required and the FLM 734 handles this function.

The protocol engine 616 of the preferred embodiment also contains a series processors to perform required operations, each processor including the appropriate firmware for the function of the processor. The first processor is a control queue processor (CQP) 738. The control queue processor 738 performs commands submitted by the various host drivers via control queue pairs. This is relevant as queue pairs are utilized to perform RDMA operations. The processor 738 has the capability to initialize and destroy queue pairs and memory regions or windows. A second processor is the out-of-order processor (OOP) 740. The out-of-order processor 740 is used to handle the problem of TCP/IP packets being received out-of-order and is responsible for determining and tracking the holes and properly placing new segments as they are obtained. A transmit error processor (TEP) 742 is provided for exception handling and error handling for the TCP/IP and iWARP protocols. The final processor is an MPA reassembly processor 744. This processor 744 is responsible for managing the receive window buffer for iWARP and processing packets that have MPA FPDU alignment or ordering issues.

Prior to proceeding with the description, following are definitions of various terms.

Virtual Device: Generic term for the "I/O adapters" inside ECA 400. The ECA 400 of the preferred embodiments implements these virtual devices: four host NICs, which are connected to the operating system; 12 internal NICs, which are private or internal NICs that are not exposed to the operating system directly; four management NICs; one TCP Offload Engine (TOE); one iSCSI acceleration engine; and one iWARP acceleration engine.

Service: One or more virtual devices are used in concert to provide the I/O Services implemented by ECA 400. The four major ECA 400 I/O Services are: Network, Accelerated Sockets, Accelerated RDMA, and Block Storage. A given I/O Service may be provided by different underlying virtual devices, depending on the software environment that ECA 400 is operating in. For example, the Accelerated Sockets I/O Service is provided using TOE and Host NIC(s) in one scenario, but is provided using TOE and Internal NIC(s) in another scenario. Virtual devices are often not exclusively owned by the I/O Services they help provide. For example, both the Accelerated Sockets and Accelerated RDMA I/O Services are partly provided using the TOE virtual device. The only virtual device exclusively owned is iSCSI, which is owned by Block Storage.

PCI Function: ECA 400 is a PCI multi-function device as defined in the PCI Local Bus Specification, rev 2.3. ECA 400 implements from one to eight PCI Functions, depending on configuration. Each PCI Function exports a group of I/O Services that is programmed by the same device driver. A PCI Function usually has at least one unique IP address and always has at least one unique MAC address.

Endnode: A virtual device or set of virtual devices with a unique Ethernet MAC address.

ECA Logical Model: The ECA Logical Model describes how ECA 400 functionality (e.g. Ethernet ports, virtual devices, I/O Services, etc) will be presented to end users. It is to be understood that certain aspects of the ECA Logical Model do not map directly and simply to the physical ECA 400 implementation. For example, there are no microswitches in the ECA 400 implementation. Microswitches are virtual, and the transaction switch 608 implements their functionality. Management and configuration software saves information in NVRAM that defines the Logical Model.

Each microswitch basically has the functionality of a layer 2 Ethernet switch. Each arrow connecting to a microswitch represents a unique endnode. The ECA 400 preferably comprises at least 20 unique Ethernet unicast MAC addresses as shown.

A microswitch is only allowed to connect between one active Ethernet port or link aggregated port group and a set of ECA 400 endnodes. This keeps the microswitch from requiring a large forwarding table, resulting in a microswitch being like a leaf switch with a single default uplink port. Inbound packets always terminate at one or more ECA 400 endnodes so that there is no possibility of switching from one external port to another. Outbound packets sent from one ECA 400 endnode may be internally switched to another ECA 400 endnode connected to the same microswitch. If internal switching is not required, the packet always gets forwarded out the Ethernet or uplink port.

Each Ethernet port has its own unique unicast MAC address, termed an ECA 400 "management MAC address". Packets using one of these management MAC addresses are always associated with a management NIC virtual device. Packets sent to these addresses will often be of the fabric management variety.

A box labeled "mgmt filter" within the microswitch represents special filtering rules that apply only to packets to/from the management NIC virtual devices. An example rule: Prevent multicast packets transmitted from a management NIC from internally switching.

Figure 8:
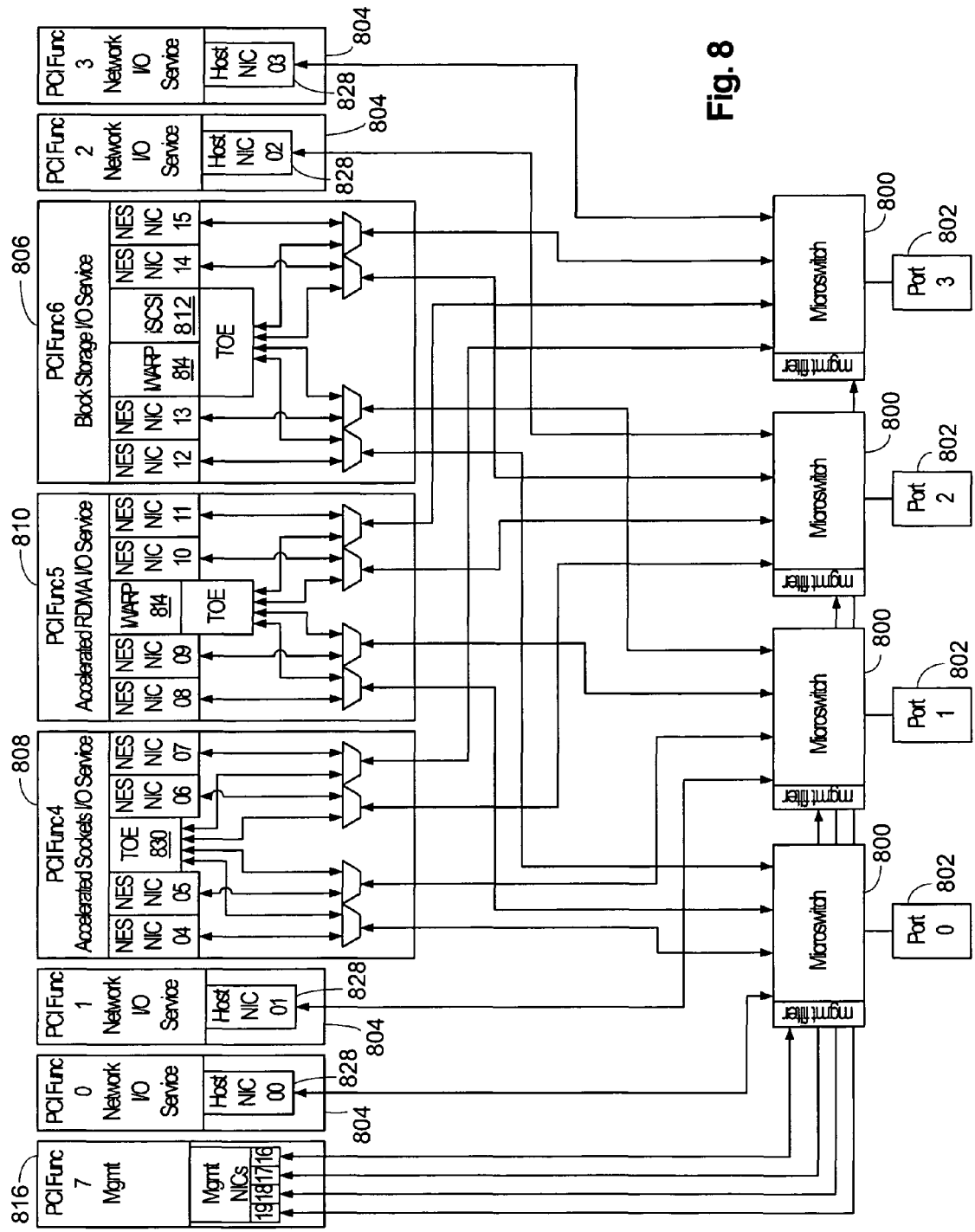
FIG. 8 is a block diagram of 9 logical model of an embodiment according to the present invention.

If there is a "mux" or multiplexer in an ECA Logical Model, this signifies packet classification. In FIG. 8, for example, the muxes associated with Block Storage, Accelerated Sockets, and Accelerated RDMA I/O Services represent the quad hash from the TCP and IP values. The quad hash is used to determine whether a given packet is accelerated or not, so that non-accelerated packets go to the connected NIC and the accelerated packets go to the connected TOE.

Each I/O Service is associated with an "affiliated NIC group". An "affiliated NIC group" always contains four NIC virtual devices. The number of active NIC virtual devices within an "affiliated NIC group" is always equal to the number of ECA 400 Ethernet ports in use. Organizing ECA 400 NIC virtual devices into "affiliated NIC groups" is useful because it helps determine which NIC should receive an inbound packet when link aggregation is active and because it helps prevent outbound packets from being internally switched in some cases.

Each accelerated I/O Service (Accelerated Sockets, Accelerated RDMA, and Block Storage) is associated with an "affiliated NIC group" because it provides a portion of its services using an "affiliated" TCP/IP stack running on the host or server. The "affiliated" TCP/IP stack transmits and receives packets on ECA 400 Ethernet ports via these affiliated NICs. There may be multiple TCP/IP stacks simultaneously running on the host to provide all of the ECA 400 I/O Services. The portion of services provided by an "affiliated" TCP/IP stack are:

Initiates TCP/IP connection: An affiliated TCP/IP stack is responsible for initiating each TCP/IP connection, and then notifying the ECA 400. Once notified, the ECA 400 will perform the steps required to transfer the connection from the host to the corresponding Accelerated I/O Service, and will then inform the host of the success or failure of the transfer in an asynchronous status message.

Performs IP fragment reassembly: the ECA 400 does not process inbound IP fragmented packets. Fragmented packets are received by their affiliated TCP/IP stack for reassembly, and are then returned to the ECA 400 for higher layer processing.

Processes fabric management, e.g. ARP or ICMP, messages.

All I/O Services transfer data between the ECA 400 and the host using the Queue Pair (QP) concept from iWARP verbs.

While the specific policy called out in the iWARP verbs specification may not be enforced on every I/O Service, the concepts of submitting work and completion processing are consistent with iWARP verbs. This allows a common method for submitting and completing work across all I/O Services. The WQE and CQE format used on QPs and CQs across QPs on different I/O Services vary significantly, but the mechanisms for managing WQs (work queues) and CQs (completion queues) are consistent across all I/O Services.

The ECA 400 preferably uses a flexible interrupt scheme that allows mapping of any interrupt to any PCI Function. The common elements of interrupt processing are the Interrupt Status Register, Interrupt Mask Register, CQ, and the Completion Event Queue (CEQ). ECA 400 has sixteen CEQs that can be distributed across the eight PCI Functions. CEQs may be utilized to support quality of service (QOS) and work distribution across multiple processors. CQs are individually assigned to one of the sixteen CEQs under software control. Each WQ within each QP can be mapped to any CQ under software control. This model allows maximum flexibility for work distribution.

The ECA 400 has 16 special QPs that are utilized for resource assignment operations and contentious control functions. These Control QPs (CQPs) are assigned to specific PCI Functions. Access to CQPs is only allowed to privileged entities. This allows overlapped operation between verbs applications and time consuming operations, such as memory registration.

System software controls how the ECA 400 resources are allocated among the active I/O Services. Many ECA 400 resources can be allocated or reallocated during run time, including Memory Regions, PBL resources, and QPs/CQs associated with Accelerated I/O Services. Other ECA 400 resources, such as protection domains, must be allocated once upon reset. By allowing most ECA 400 resources to be allocated or reallocated during run time, the number of reboots and driver restarts required when performing ECA 400 reconfiguration is minimized.

There are two major operating system types, unaware operating systems and aware operating systems. In the context of this description, unaware operating systems are those that do not include a TCP/IP stack that can perform connection upload/download to an Accelerated Sockets, Accelerated RDMA, or Block Storage I/O Service. The TCP/IP stack is unaware of these various ECA 400 I/O Services. With such operating systems, the host TCP/IP stack is only used for unaccelerated connections, and one or more additional TCP/IP stacks, referred to throughout this description as internal stacks exist to perform connection setup and fabric management for connections that will use Accelerated I/O Services. For example, any application that wishes to use an Accelerated RDMA connection will establish and manage the connection through an internal stack, not through the host stack.

In the context of this description, aware operating systems are those that include a TCP/IP stack that can perform connection upload/download to one or more of: Accelerated Sockets, Accelerated RDMA, or Block Storage I/O Service, i.e. the TCP/IP stack is aware of these various I/O Services. Currently those operating systems are only from Microsoft. Future Microsoft operating systems will incorporate a TOE chimney or TOE/RDMA chimney, enabling connection transfer between the host TCP/IP stack and the Accelerated Sockets or Accelerated RDMA I/O Services. Typically the host TCP/IP stack is used to establish a connection and then the ECA 400 performs connection transfer to the Accelerated Sockets or Accelerated RDMA I/O Service. The advantage of this cooperation between the host stack and the ECA 400 is to eliminate the need for many or all of the internal stacks.

In addition to the characteristics described above, for operation of the preferred embodiment each of the operating system types described above utilizes an independent driver model. Legacy operating systems such as Windows NT4 typically support only this model. These operating systems require a separate, independent driver to load for each I/O Service. With this model, the I/O Service to PCI Function ratio is always 1:1.

The primary example is unaware operating system and is shown in FIG. 8. This Logical Model uses at least 16 IP addresses when all ports 802 are active, with one IP address per I/O Service per active port. This programming model uses at least 20 MAC addresses, with five per active microswitch 800. There are four independent TCP/IP stacks running on the host in this environment: the host stack connected to the Network I/O Service 804, an internal stack connected to the Block Storage I/O Service 806, an internal stack connected to the Accelerated Sockets I/O Service 808, and an internal stack connected to the Accelerated RDMA I/O Service 810.

The Block Storage I/O Service 806 has access to both the iSCSI 812 and iWARP virtual devices 814, which allows it to support both iSCSI and iSER transfers.

If the host supports the simultaneous use of more than one RDMA API, VI and DAPL, then these APIs connect to the ECA 400 through a single shared PCI Function.

This model uses this fixed mapping between I/O Services and PCI Functions:

| | |
|---|---|
| PCI Function 0, 1, 2, 3 = | Network I/O Service 804 |
| PCI Function 4 = | Accelerated Sockets I/O Service 808 |
| PCI Function 5 = | Accelerated RDMA I/O Service 810 |
| PCI Function 6 = | Block Storage I/O Service 806 |
| PCI Function 7 = | Management NIC 816 |

It is understood that administration of a machine with multiple active TCP/IP stacks is more complicated than administration of a machine with a single active TCP/IP stack and that attempts to interact between stacks, such as to coordinate TCP port space usage, must use unconventional means to provide a robust implementation since no OS-architected method for interaction is available.

Thus the Logical Model according to FIG. 8 presents four virtual host NICs 828, a virtual TOE 830, a virtual iSCSI engine 812, a virtual iWARP unit 814 and a virtual management device 816. Each of the virtual devices is then connected to the virtual microswitches 800, which in turn are connected to ports 802. The devices are virtual because, as shown in FIGS. 6 and 7, no such devices actually exist, only the devices shown in those Figures. However, the ECA 400 presents these virtual devices to conform to the requirements of the unaware operating system, independent driver deployment situation. These virtual devices are configured as appropriate to provide the desired I/O service or function, such as Network I/O Services 804, Block Storage I/O Services 806, RDMA I/O Service 810 and Accelerated Sockets I/O Service 808.

In the preferred embodiment the ECA 400 supports the programming of any I/O Service and any Virtual Device from any PCI Function. When drivers load, they learn through configuration parameters which I/O Services and Virtual Devices are configured as active on their PCI function and restrict themselves to programming only these I/O Services and Virtual Devices. Alternatively, I/O Services and Virtual Devices may be determined by operating system needs and the appropriate drivers are loaded. When a driver posts a new command to the adapter, mapping values inside the protocol engine 616 are used to associate each command with the appropriate I/O Service, Virtual Device(s) and an Ethernet port.

In the preferred embodiment the manager system allows NIC, clustering, and storage drivers to load or unload in any order on any combination of PCI functions without interfering with the operation of drivers that remain in the running state during the transition of the effected driver. Any requests to a software component that is in the process of unloading will be stalled until a handoff to another capable manager has occurred.

There are some basic concepts that this manager architecture preferably employs. First, the hardware portion of the interface is only used when necessary due to the impact to the system of accessing the hardware when compared to local software mechanisms. Second, each type of manager has one manager designated as the active manager which will be responsible for performing the functions for that manager type. All other managers of that type are required to call their respective active manager using a provided safe mechanism. Third, each manager provides two sets of interfaces: 1) one that is provided to the user of the manager, and 2) another that is used by other managers of the same type. The types of managers include, but are not limited to, the Global Interface Manager (GIM), various Resource Managers (RMs) and various Access Managers (AMs). The GIM uses the hardware of the ECA 400 to insure that only one GIM is active. All other managers can use the GIM to insure that only one active manager exists for each type of manager.

The GIM is used as a central repository for the lists of RMs and AMs. Whenever access to an RM or AM is needed, the GIM is consulted to find the correct manager. RMs are used to manage lists of software or hardware resources. A few examples of RMs are Memory Region Table Entry (MRTE) Manager, Perfect Filter Table Entry Manager, and the Multicast Hash Entry Manager. These resource managers control resources that are implemented globally by the ECA 400, but need to be managed per driver or PCI function in order to isolate failures and prevent resource over-usage. A driver might request a block of MRTEs from the MRTE RM. The active MRTE RM owns all MRTEs implemented by the ECA 400 and "loans" them to drivers as they request them.

AMs are used to manage access to particular hardware resources. Two example AMs are the EEPROM Manager and the Flash Manager. In this case only one driver is able to access the EEPROM and/or Flash at a time due to the nature of the interface to the EEPROM and Flash. A driver would first obtain access to the hardware resource from the AM, then access the resource through ECA 400 registers once granted access, and the notify the AM that access is no longer needed.

Figure 9:
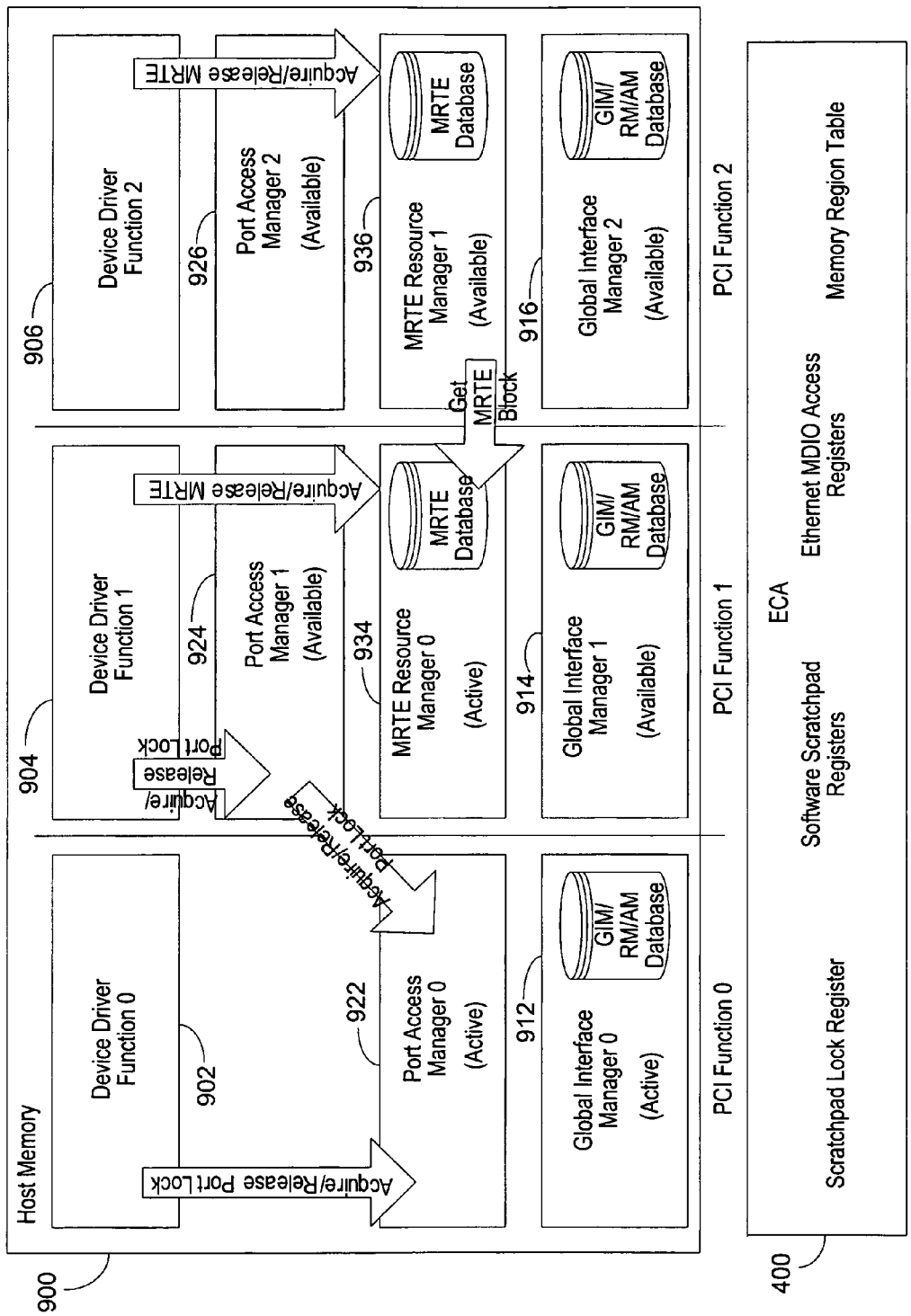
FIGS. 9 and 10 are block diagrams that illustrate a global interface managers, resource managers and access managers for managing shared resources of I/O services according to the present invention.

FIG. 9 shows a system with an ECA 400 that has exposed three PCI functions. Each function has a device driver that is responsible for exporting ECA 400 functionality to the host operating system. Host memory 900 thus includes device driver 902 for PCI Function 0, device driver 904 for PCI Function 1 and device driver 906 for PCI Function 2. Each PCI function has a GIM and Port Access Manager loaded, GIM 0 912 and Port AM 0 922 for PCI Function 0, GIM 1 914 and Port AM 1 924 for PCI Function 1 and GIM 2 916 and Port AM 2 926 for PCI Function 2, PCI Functions 1 and 2 also load MRTE Resource Managers, MRTE RM 1 924 and MRTE RM 2 934, since they are exporting iWARP functionality. This is not required for PCI Function 0 as it does not include iWARP functionality in the example. Basically each GIM 912, 914 or 916 contains an Exclusion Interface and a GIM interface described below. The GIM 912, 914 or 916 for each function uses an algorithm described below to determine if it is the active GIM. Each GIM 912, 914 and 916 also contains a database of the various managers that it is aware of in the system. If or when a GIM hands off its responsibilities to another available GIM, the database that it has built up is also handed to the new active GIM. RMs also hand the database associated with the resources they manage to a new active RM when a handoff operation occurs. The algorithm for determining what RM is active is below. AMs do not have a database associated with them since they do not manage resources, but only control access to directly accessed chip registers.

In the simplified example of FIG. 9, each MRTE RM 934 and 936 has two entry points exported. The first one is Acquire/Release MRTE, which is called by a consumer of the MRTE RM interface, typically the related device driver. The second entry point is Get MRTE, which is used by an inactive or available MRTE RM, to get a block of MRTEs from the active MRTE RM that it can use to satisfy calls to Acquire/Release MRTEs without constantly calling the active MRTE RM. Each Port AM 922, 924 and 926 has a single illustrated entry point named Acquire/Release Port Lock which is used by the device driver to acquire/release permission to program ECA 400 registers that provide access to Ethernet PHY MDIO registers used to manage the Ethernet link state. Much more elaborate interfaces are actually needed to manage the ECA 400, but are not detailed for purposes of simplifying this description.

Prior to describing examples of manager operations, a few more background descriptions are considered helpful. The first relates to hardware assistance. The hardware portion of a GIM is implemented with several registers. The first register is a Scratchpad Lock register. The Scratchpad Lock Register provides a locking mechanism for software to use to synchronize access to the Scratchpad registers. The mechanism requires that each driver contending for this lock must use a unique lock_requester_id. To obtain the lock a driver writes a value including its lock_requester_id and a lock request to the Scratchpad Lock Register. The driver then reads the Scratchpad Lock Register. If the read result indicates a locked and the lock_owner_id is equal to the driver's lock_requester_id, then lock is owned by the driver. This operation is repeated until the driver acquires lock.

A set of the Software Scratchpad registers are for use by ECA 400 software and drivers as needed. Preferably there are twelve 32-bit registers that store the last value written to them. All of these individual registers are accessible from all of the ECA 400 PCI functions. This allows host software to distribute software that must access any lock maintained by the hardware across the independent drivers loaded for different PCI functions exposed by the ECA 400. While the Software Scratchpad registers have no specific meaning to the ECA 400 hardware, the host software preferably uses the first two of these software scratchpad values as a single 64-bit value that is the host address of the currently active GIM. The way the software uses this scratchpad locator and associated lock to atomically obtain the currently active GIM is defined in the following pseudocode.

```
Obtain the lock from the Scratchpad Lock register
read Software Scratchpad 0,1 into a 64-bit pointer (pGIM)
```

-continued

```
if (NULL = = pGIM)
{
    pGIM = this driver GIM
        write pGIM back to Software Scratchpad 0,1
}
Release the lock from the Scratchpad Lock register
```

The core base class that is used by all managers to interface with other managers of the same type is the Exclusion Interface (EIF). The entry points defined by the EIF are Handoff, Hold for New Owner, New Owner, Register and Deregister. Additionally the EIF class has a software lock, a pointer to the active manager of that type, and a table of other EIFs that have been registered.

The Handoff entry point is used to pass active manager designation and resources from one manager to another of the same type. HoldForNewOwner is used to acquire the software lock for a manager before performing a handoff operation. After performing the handoff operation, the NewOwner entry point is called to inform the managers of the new active manager and to release the software lock within the managers. The Register entry point is used to notify the currently active manager that another manager of the same type is available. The newly registered manager may be able to take over active manager duties and would need to be told of any handoffs that are performed. The Deregister entry point is used to notify the currently active manager that a previously available manager is no longer available.

In addition to the EIF entry points described above, each GIM supports additional interfaces to allow registration of other managers (RMs/AMs). These interfaces are Lock, Release, Get Interface, Register Interface, Deregister Interface, and Deregister Interface.

A manager uses the Lock and Release entry points to ensure that the active manager completes its requested operation before attempting a handoff operation. The operations to register different types of services are Get, Register, Reregister and Deregister Interface. The operations are used mainly to register new RMs or AMs with a GIM. The GIM must be aware of all RMs and AMs, not just active RMs and AMs, so that if it hands off active manager designation to another GIM, all of the RMs and AMs can be properly notified. Other entry points and data elements may be defined for GIMs, RMs and AMs but are not relevant to this description.

With that background, description of the operations of the some usage scenarios of the GIMs, RMs and AMs is appropriate. This is not an exhaustive list of the scenarios but should be representative and allow derivation of other scenarios to readily be done by one skilled in the art.

At driver initialization, each ECA 400 driver must look to see if there is already a GIM running. It must either register with that active GIM or assert itself as the active GIM. Additionally, the driver must do the same for each RM or AM that it intends to use. Remember that a driver must be prepared to be a RM or AM for other drivers if it needs to use a given RM or AM. The following pseudocode demonstrates the process for driver startup and GIM registration:

```
Obtain the lock from the Scratchpad Lock register
read Software Scratchpad 0,1 into a 64 bit pointer (pGIM)
if (NULL = = pGIM)
{
    pGIM = this driver GIM
    write pGIM back to Software Scratchpad 0,1
}
Call pGIM->Register to notify active GIM of the new driver
Release the lock from the Scratchpad Lock register
```

Note that the Register must take place with the hardware lock held or else a window opens up where the GIM pointer acquired from the hardware might no longer be valid.

The registration of the RMs and AMs must take place after GIM Registration because each RM/AM needs to use a GIM. The following pseudocode demonstrates the process for a RM/AM to startup and register itself with the GIM. The AM/RM type identifies the manager, such as qp resource manager vs memory region resource manager, etc.

```
Call GIM->Lock
Call GIM->GetInterface (pGIM, AM/RM type) to get a pointer
    (p-AM/RM)
if (NULL = = p-AM/RM)
{
    p->AM/RM = this driver AM/RM
    Call pGIM->RegisterInterface (this driver AM/RM)
}
Call pGIM->Register to notify active AM/RM of the new driver
Call GIM->Release
```

Note that GIM→Lock obtains the lock in the local GIM before calling the active GIM. This allows a GIM to safely do a handoff operation without causing a fault.

The allocation/deallocation of a resource or access to a resource is performed by a driver through the use of its AM/RM. The driver will perform the appropriate function call that the AM/RM provides, for instance AllocateQueuePair(), and passes to the function the AM RM's handle. This function provided by the AM/RM is actually a pass-through function that will lock the AM/RM so that the active AM/RM cannot be handed off while this function call is in progress. After obtaining this lock, the pass-though function will call the active AM/RM's process version of this function. Whatever logic needed for this function will be implemented in the active AM/RM and the results are returned to the pass-through function. The pass-though version then frees its lock and returns. In certain instances, such as the MRTE RM 1 936 of FIG. 9, at the first Acquire MRTE request from the device driver function 2 906, the MRTE RM 1 936 requests an MRTE block from the active MRTE RM 0 954. After receiving the MRTE block, the MRTE RM 1 936 can reply directly without interacting with the active MRTE RM 0 934 until all of the MRTEs in the block are utilized. then the MRTE RM 1 936 must request another MRTE block.

The GIM handoff operation makes use of the hardware lock and each GIM's local lock in order to ensure a robust handoff is possible. The following psuedocode illustrates the operation

```
Obtain the lock from the Scratchpad Lock register
for each pGIM registered with the GIM
{
    call pGIM->HoldForNewOwner
}
pick a new active GIM from the list of registered GIMs (pNewGIM)
call pNewGIM->Handoff. If it returns a failure code, pick another GIM to
hand off to and try again.
for each pGIM registered with the GIM
{
    call pGIM->NewOwner
}
write pNewGIM into Software Scratchpad 0,1
Release the locks from the Scratchpad Lock register
```

During operations it may be appropriate to shutdown and unload a driver. Illustrative psuedocode is shown below.

```
for each RM/AM the driver owns
{
    call pGIM->DeregisterInterface
}
for each RM/AM the driver owns
{
    if pLocalMGR.Active
    {
        for each pMGR registered with the local active manager
        {
            call pMGR->HoldForNewOwner
        }
        pick a new active MGR from the list of registered MGRs
        (pNewActiveMGR)
        call pNewActiveMGR->Handoff.
        If it returns a failure code,
            pick someone else to hand off to and try again.
        for each pMGR registered with the local manager
        {
            call pMGR->NewOwner
        }
    }
}
read Software Scratchpad 0,1 into a 64 bit pointer (pGIM)
if (ourGIM = = pGIM)
{
    perform GIM Handoff
}
```

Therefore in FIG. 9 device driver 902 loads originally. With this 'Port Access Manager 0' 922 loads, as does 'Global Interface Manager 0' 912. As in this example driver function 0 902 is the first to load. Its GIM 0 912 and Port AM 0 922 become active in the process described above. In the illustrated example, device driver 904 loads next. As a result, its Port AM 1 924, its MRTE RM 0 934 and its GIM 1 914 load. As described above, the GIM 1 914 determines it is not active, the MRTE RM 0 934 determines it is active and the Port AM 1 924 determines it is not active, just available. Then device driver Function 2 906 loads with its Port AM 2 926, MRTE RM 1 936 and GIM 2 916. All of its managers become available as a prior manager in each type is previously registered and active. When any of the device drivers wish to release or acquire a port lock they access the relevant port access manager, which in the case of device driver Function 1 904 or device driver Function 2 906 pass this through to the relevant resource manager. The Port AM 0 922 is active so it can immediately respond to the device driver Function 0 902. The Port AM 1 924 is not active and so it must acquire the port lock from the active manager Port AM 0 922. In the cases of device driver function 1 904 requesting an MRTE entry, the request is transferred through the Port AM 1 924 to the MRTE RM 0 934. As this is the active RM for this type, the value is simply returned to the device driver. When device driver function 2 906 requests an MRTE the request is passed to the MRTE RM 1 936. As this is not the active RM, a request is made to the active RM to obtain an MRTE block and when this block is returned then the MRTE RM 1 936 can return a MRTE value to the device driver 906. As can be seen, this is a highly structured technique to allow close control of the various resources that are in the ECA 400 without being overly complicated and yet it is extensible.

Figure 10:
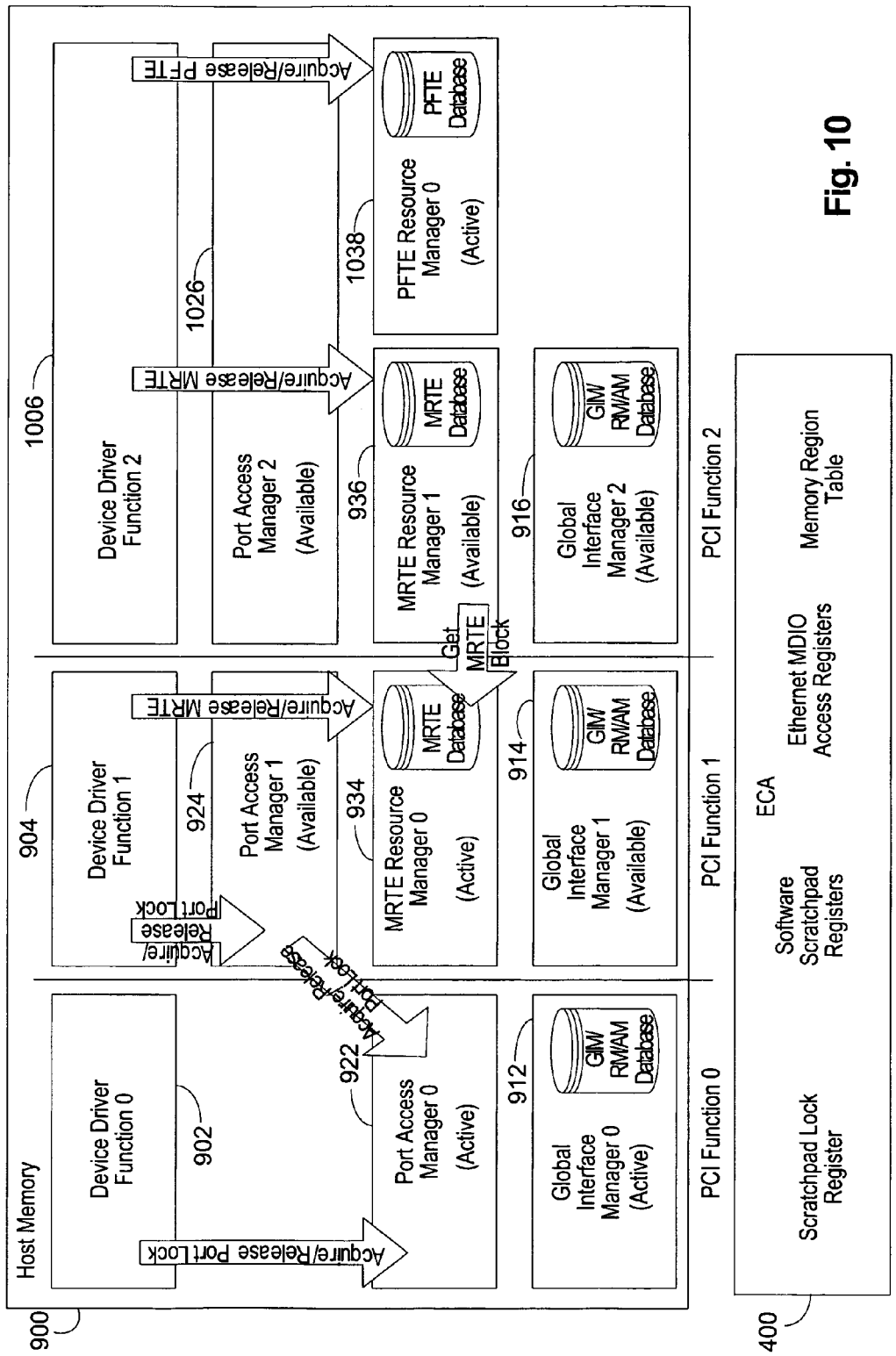

For example, in FIG. 10 the device driver Function 2 1006 is slightly different in that it also requires a second set of resources, the PFTE resources, so that PFTE RM 0 1038 is present and active as it is the only one for that resource. Should it require a PFTE value, this device driver Function 2 1006 does this through the PFTE RM 0 1038. Thus FIG. 10 shows multiple resource managers of different resources available for one particular device driver.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. An apparatus comprising:
an adapter to be comprised in a server and being capable of providing a plurality input/output (I/O) services, the server including a plurality of central processing units and host memory, the adapter to be coupled to the plurality of central processing units via an interface, the server including a certain operating system that is one of a plurality of different operating systems to access the I/O services via drivers and an interface manager comprised in the server, the adapter including modules to implement the I/O services, the adapter also including ports to be coupled to a network, the modules being to implement TCP offload, iSCSI protocol, and iWARP RDMA protocol-related functions, the drivers being to export adapter functionalities to the certain operating system, the adapter functionalities being associated in accordance with a mapping with peripheral component interconnect (PCI) functions, the mapping being to map the I/O services that are implemented by the modules to one or more respective ones of the PCI functions, the manager to allow the drivers to load and unload in any order on any combination of the PCI functions while permitting operation of remaining running drivers to continue during driver transitions, a request to an unloading component to be stalled until handoff to another capable component has occurred, the interface manager to be used to manage which other managers in the server are actively controlling adapter resources on a per PCI function basis to permit failure isolation and to prevent resource over-usage, and when a handoff operation from one manager to another manager is to occur, information related to resources managed by the one manager is to be provided to the another manager.

2. The apparatus of claim 1, wherein:
the different operating systems have different techniques to establish an accelerated connection, the different techniques involving use of one of a host stack and an internal stack, respectively, the internal stack being in addition to the host stack, the host stack being comprised in the certain operating system.

3. The apparatus of claim 1, wherein:
the adapter includes a transaction switch to selectively couple the modules to the ports, the interface, and a local memory interface, the local memory interface being comprised in the adapter and to be coupled to temporary buffer memory.

4. The apparatus of claim 1, wherein:
if the handoff occurs, a database associated with managed resources is to be handed off;
the drivers comprise block storage, RDMA, and TCP drivers; and
the adapter comprises packet parsers coupled to the ports.

5. The apparatus of claim 1, wherein:
the adapter is capable of managing adapter resource utilization by the drivers, and the managing of the adapter resource utilization comprises:
loading, with each device driver, a first type manager, the first type manager controlling a lock function;
establishing the first loaded first type manager as active manager and any later loaded first type managers as available managers; and
the available first type managers cooperating with the active first type manager to manage resources of the adapter.

6. The apparatus of claim 5, wherein:
the managing of the adapter resource utilization also comprises:
loading a second type manager with each device driver, the second type manager being a port access manager;
establishing the first loaded second type manager as active manager and any later loaded second type managers as available managers;
the active second type manager cooperating with the active first type manager to manage resources of the adapter; and
the available second type managers cooperating with the active second type manager to manage resources of the adapter.

7. The apparatus of claim 6, wherein:
the managing of the adapter resource utilization also comprises:
transferring active state from an active manager to an available manager when a device driver associated with the active manager is unloaded.

8. The apparatus of claim 7, wherein:
the managing of the adapter resource utilization also comprises:
informing all relevant managers of a new active manager.

9. A method comprising:
providing by an adapter a plurality input/output (I/O) services, the adapter to be comprised in a server, the server including a plurality of central processing units and host memory, the adapter to be coupled to the plurality of central processing units via an interface, the server including a certain operating system that is one of a plurality of different operating systems to access the I/O services via drivers and an interface manager comprised in the server, the adapter including modules to implement the I/O services, the adapter also including ports to be coupled to a network, the modules being to implement TCP offload, iSCSI protocol, and iWARP RDMA protocol-related functions, the drivers being to export adapter functionalities to the certain operating system, the adapter functionalities being associated in accordance with a mapping with peripheral component interconnect (PCI) functions, the mapping being to map the I/O services that are implemented by the modules to one or more respective ones of the PCI functions, the manager to allow the drivers to load and unload in any order on any combination of the PCI functions while permitting operation of remaining drivers to continue during driver transitions, a request to an unloading component to be stalled until handoff to another capable component has occurred, the interface manager to be used to manage which other managers in the server are actively controlling adapter resources on a per PCI function basis to permit failure isolation and to prevent resource overusage, and when a handoff operation from one manager to another manager is to occur, information related to resources managed by the one manager is to be provided to the another manager.

10. The method of claim 9, wherein:
the different operating systems have different techniques to establish an accelerated connection, the different techniques involving use of one of a host stack and an internal stack, respectively, the internal stack being in addition to the host stack, the host stack being comprised in the certain operating system.

11. The method of claim 9, wherein:
the adapter includes a transaction switch to selectively couple the modules to the ports, the interface, and a local memory interface, the local memory interface being comprised in the adapter and to be coupled to temporary buffer memory.

12. The method of claim 9, wherein:
if the handoff occurs, a database associated with managed resources is to be handed off;
the drivers comprise block storage, RDMA, and TCP drivers; and
the adapter comprises packet parsers coupled to the ports.

13. The method of claim 9, wherein:
the adapter is capable of managing adapter resource utilization by the drivers, and the managing of the adapter resource utilization comprises:
loading, with each device driver, a first type manager, the first type manager controlling a lock function;
establishing the first loaded first type manager as active manager and any later loaded first type managers as available managers; and
the available first type managers cooperating with the active first type manager to manage resources of the adapter.

14. The method of claim 13, wherein:
the managing of the adapter resource utilization also comprises:
loading a second type manager with each device driver, the second type manager being a port access manager;
establishing the first loaded second type manager as active manager and any later loaded second type managers as available managers;
the active second type manager cooperating with the active first type manager to manage resources of the adapter; and
the available second type managers cooperating with the active second type manager to manage resources of the adapter.

15. The method of claim 14, wherein:
the managing of the adapter resource utilization also comprises:
transferring active state from an active manager to an available manager when a device driver associated with the active manager is unloaded.

16. The method of claim 15, wherein:
the managing of the adapter resource utilization also comprises:
informing all relevant managers of a new active manager.

17. Computer-readable memory having machine-executable instructions that when executed by a machine result in performance of operations comprising:
providing by an adapter a plurality input/output (I/O) services, the adapter to be comprised in a server, the server including a plurality of central processing units and host memory, the adapter to be coupled to the plurality of central processing units via an interface, the server including a certain operating system that is one of a plurality of different operating systems to access the I/O services via drivers and an interface manager comprised in the server, the adapter including modules to implement the I/O services, the adapter also including ports to be coupled to a network, the modules being to implement TCP offload, iSCSI protocol, and iWARP RDMA protocol-related functions, the drivers being to export adapter functionalities to the certain operating system, the adapter functionalities being associated in accordance with a mapping with peripheral component interconnect (PCI) functions, the mapping being to map the I/O services that are implemented by the modules to one or more respective ones of the PCI functions, the manager to allow the drivers to load and unload in any order on any combination of the PCI functions while permitting operation of remaining drivers to continue during driver transitions, a request to an unloading component to be stalled until handoff to another capable component has occurred, the interface manager to be used to manage which other managers in the server are actively controlling adapter resources on a per PCI function basis to permit failure isolation and to prevent resource overusage, and when a handoff operation from one manager to another manager is to occur, information related to resources managed by the one manager is to be provided to the another manager.

18. The computer-readable memory of claim 17, wherein:
the different operating systems have different techniques to establish an accelerated connection, the different techniques involving use of one of a host stack and an internal stack, respectively, the internal stack being in addition to the host stack, the host stack being comprised in the certain operating system.

19. The computer-readable memory of claim 17, wherein:
the adapter includes a transaction switch to selectively couple the modules to the ports, the interface, and a local memory interface, the local memory interface being comprised in the adapter and to be coupled to temporary buffer memory.

20. The computer-readable memory of claim 17, wherein:
if the handoff occurs, a database associated with managed resources is to be handed off;
the drivers comprise block storage, RDMA, and TCP drivers; and
the adapter comprises packet parsers coupled to the ports.

21. The computer-readable memory of claim 17, wherein:

the adapter is capable of managing adapter resource utilization by the drivers, and the managing of the adapter resource utilization comprises:

loading, with each device driver, a first type manager, the first type manager controlling a lock function;

establishing the first loaded first type manager as active manager and any later loaded first type managers as available managers; and the available first type managers cooperating with the active first type manager to manage resources of the adapter.

* * * * *